United States Patent
Tamano

[11] 3,972,277
[45] Aug. 3, 1976

[54] DEFROSTING APPARATUS

[76] Inventor: Tokuo Tamano, Kita-148, Ikomadai, Ikoma, Nara, Japan

[22] Filed: Feb. 14, 1975

[21] Appl. No.: 549,918

Related U.S. Application Data

[63] Continuation-in-part of Ser. No. 361,080, May 17, 1973, abandoned.

[30] Foreign Application Priority Data

Oct. 26, 1974 Japan............................. 49-123572
Jan. 22, 1975 Japan........................ 50-11032[U]

[52] U.S. Cl.................................... 99/451; 99/339; 99/362; 99/367; 99/368; 99/478; 99/DIG. 14; 426/241

[51] Int. Cl.²..................... A47J 27/16; A47J 27/66; A21B 01/46; A21B 03/04

[58] Field of Search ............ 99/339, 451, 361, 362, 99/367, 368, 467, 468, 474, 476, 477, 478, 479, 483, DIG. 14; 426/237, 241, 244, 246, 247, 524

[56] References Cited
UNITED STATES PATENTS

| | | | |
|---|---|---|---|
| 2,906,620 | 9/1959 | Jung............................................ | 426/524 |
| 3,494,722 | 2/1970 | Gray............................................. | 99/451 |
| 3,494,724 | 2/1970 | Gray............................................. | 99/451 |
| 3,674,504 | 7/1972 | Lane............................................. | 99/339 |
| 3,676,058 | 7/1972 | Gray............................................. | 426/244 |
| 3,682,643 | 8/1972 | Foster.......................................... | 99/451 |

FOREIGN PATENTS OR APPLICATIONS 246,467   1/1947   Switzerland.......................... 99/362

*Primary Examiner*—Richard E. Aegerter
*Assistant Examiner*—Richard R. Stearns

[57] ABSTRACT

A defrosting apparatus for frozen food comprises a casing defining a chamber and a tray circulating system to circulate the trays, which are removably mounted thereon, along a fixed path in the casing while each of the trays always retains a horizontal position. A cover is provided in the upper portion of the casing and consists of a pair of half members for defining an enclosed chamber for enclosing a predetermined one of the trays. The apparatus includes a micro-wave irradiator for irradiating micro-waves onto the tray when the tray is enclosed by the cover, various kinds of atmosphere conditioners provided in the chamber of the casing, and a control system for controlling the circulation of the trays in the chamber and for closing and opening the half members and the micro-wave irradiation onto the tray within the cover.

6 Claims, 22 Drawing Figures

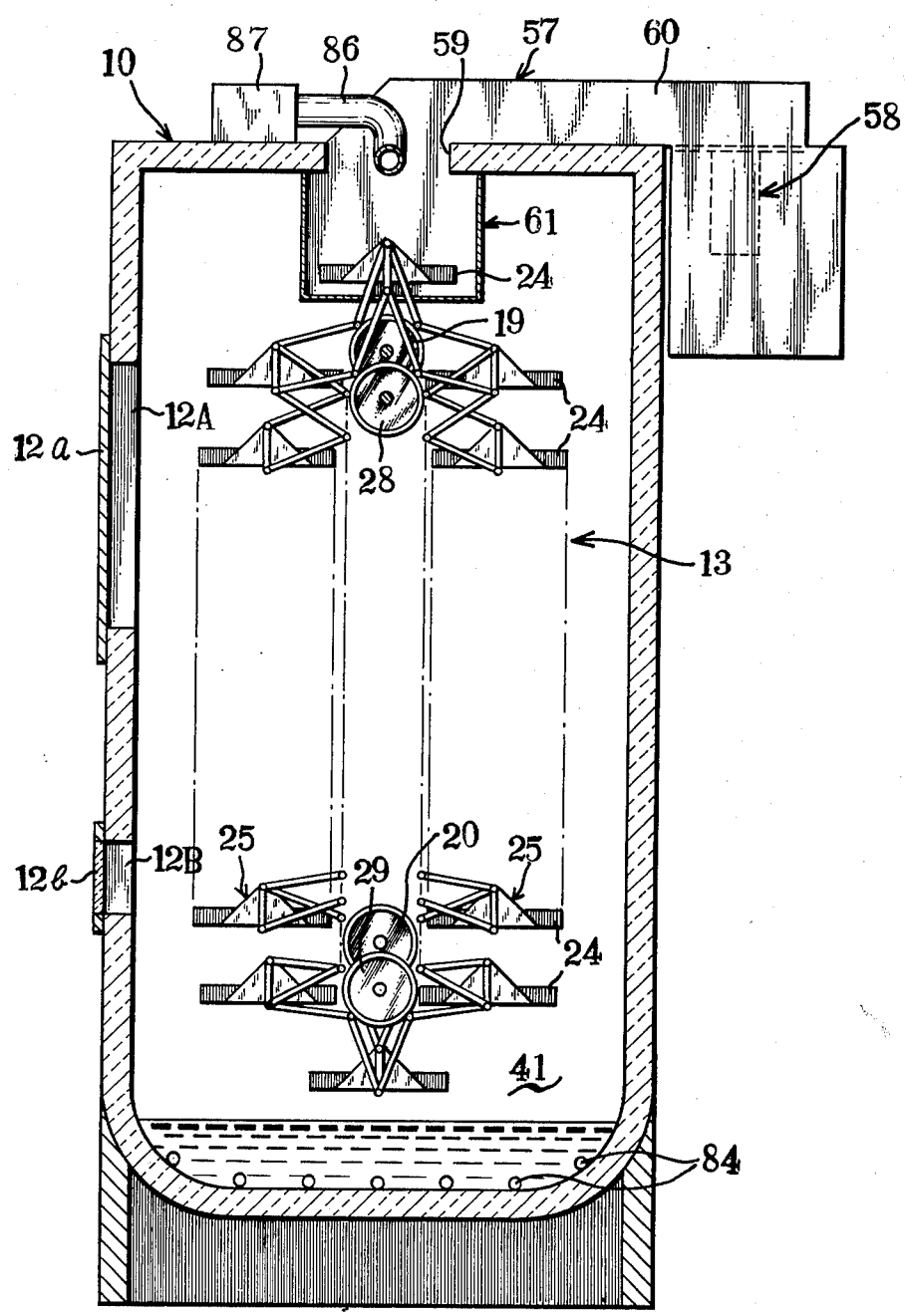

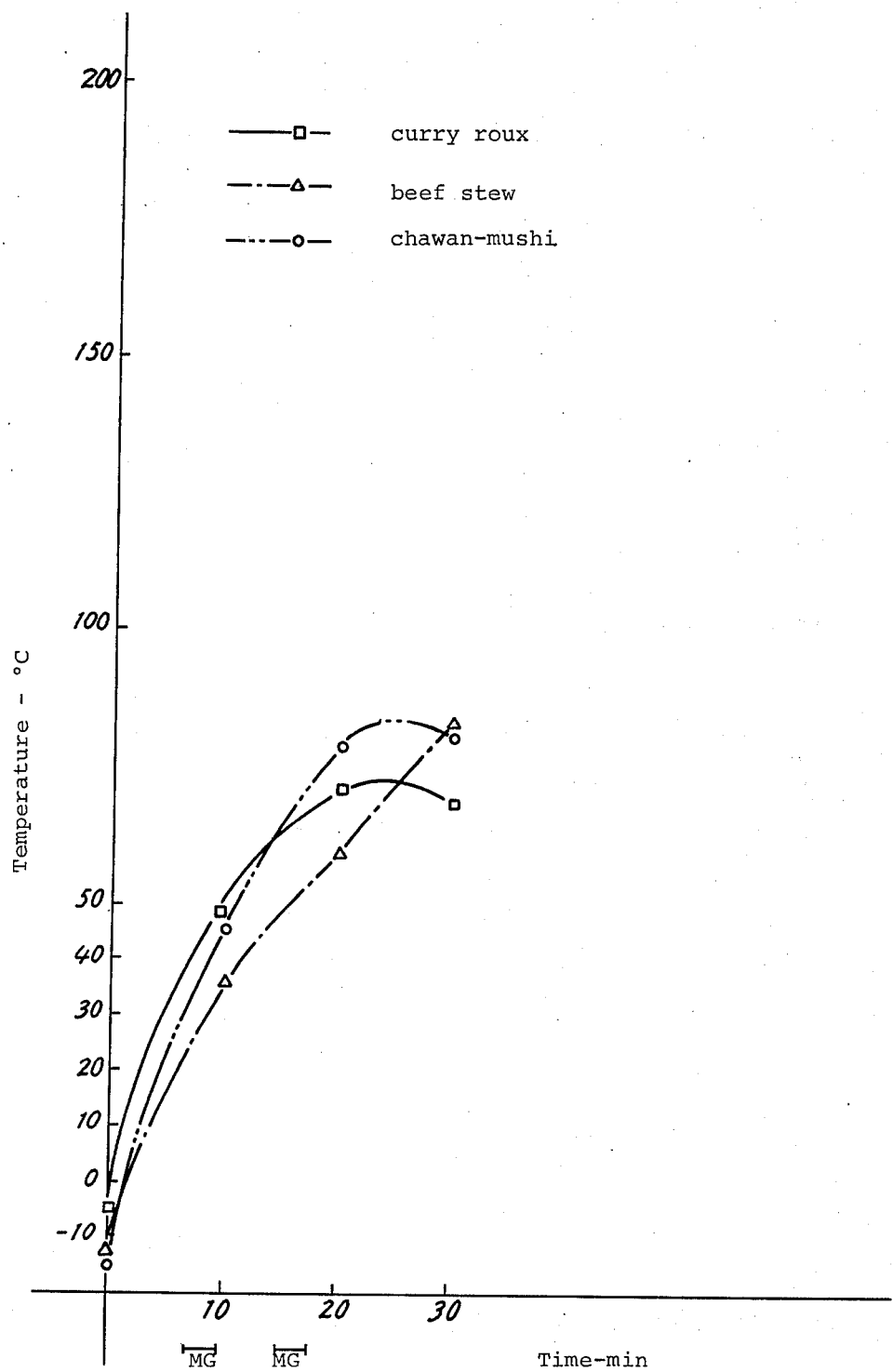
FIG.21 Oven + Microwave irradiation

DEFROSTING APPARATUS

RELATED APPLICATION

This application is a continuation-in-part of Ser. No. 361,080 filed on May 17, 1973 and now abandoned.

The present invention relates to an apparatus for most effectively defrosting various kinds and a large amount of frozen food, especially precooked frozen food.

In the present specification and claims, the word "defrosting" is intended to include releasing said frozen food from frozen state to the original state and then reconstituting or reheating the same to the proper temperature for eating.

Frozen food has spread widely throughout the world and has been yearly increasing in kind and amount because of the following advantages thereof. Namely, frozen food can maintain the taste of fresh food, which can not be achieved by any other preservable food. Its price is kept stabilized throughout all seasons. Further, cooking time and labor can be saved since it has been precooked or processed.

Accordingly, freezing art is improved in various respects and thus by adopting proper freezing methods high quality of preservation has become possible. At the same time with the development of freezing art, keen attention is paid to effective art for defrosting frozen food. However, the defrosting art has been less advanced in comparison with the freezing art. As commonly known, taste, flavor, aroma, texture and color of defrosted food depend upon the method by which the same is defrosted. In other words, the spread of frozen food depends upon effective defrosting method. This fact is especially important today when introduction of frozen food into mass feeding facilities such as restaurants, hotels, hospitals and schools attracts keen attention of many people.

However, frozen food now commonly spread is limited to one that has substantially uniform quality or comprises only one material or a few materials, having substantially the same heat transfer rates, thus having little unequality in formation thereof and being easily defrosted, which results from the unadvanced defrosting art as abovementioned. On the other hand, a manager of a mass feeding facility such as a restaurant, a hotel or the like has an earnest desire for making frozen food not only from easily defrostable food but from all the cooked food required for meals thereby achieving more efficient management.

Today, in the U.S.A., rice dishes which are Oriental food are spread not only in hotels but in ordinary restaurants. For example, rice food like curried rice comprises rice and various kinds of materials such as minced beef, carrot, potato, green peas, curry powder and the like. These materials have different heat transfer rate respectively due to the difference in thickness, size, water content and the like, which causes the formation of the food uneven. Further, other rice foods such as chicken rice, hashed meat rice, frizzled rice, sushi and the like which are Japanese food have uneven formation respectively, and therefore if they are made into frozen food, they are not defrosted in a suitable state for eating by the conventional methods. In other words, it is substantially impossible to make these rice foods into frozen food, and therefore they have usually been put up in cans for preservation. However, such canned rice foods have lost their original taste and thus there is little demand therefor.

As apparent from above, it is necessary to provide a defrosting machine which can defrost, without unevenness in formation, frozen foods such as frozen rice foods comprising a variety of materials each having different quality and which can defrost, reheat, and cook various kinds and a large amount of frozen food efficiently in correspondence with the kind of dishes.

Defrosting machines now in use are (a) an electronic range, (b) many kinds of steamers, (c) many kinds of ovens or the like, and they are all a monofunctional machine which has only a single defrosting function, which causes many kinds of problems.

Problems in the conventional defrosting machines are set forth below.

a. An electronic range;

Unevenness in defrosting and reheating results in a large amount of scatter in quality of defrosted food due to the kind thereof. For example, rice food for the staple food like curried rice comprises various kinds of materials such as minced beef, carrot, potato, green peas, rice, curry powder and the like, and therefore defrosting the same needs delicate treatments. Taste of defrosted food is apt to be uneven, and the insufficiently defrosted part and the overheated part are mixedly present which results in tasteless cooking. Further when food is defrosted by an electronic range, the surface of defrosted food is excessively dried and yellowed, and long defrosting time spoils taste thereof. Difficulty in moisture control of high grade food is a critical disadvantage of an electronic range. Magnetron, the essential part of an electronic range, is very expensive and easily consuming, so that defrosting thereby costs very high. Further, it is very difficult to defrost a large volume of frozen food at one time by an electronic range. Especially for defrosting food for mass feeding, if watery food such as soup and high grade food whose delicate taste is important are defrosted at one time, prices of dishes and their cost are unbalanced. An apparatus is requested for most beneficial defrosting from the economical viewpoint in accordance with the kind of food to be defrosted.

b. A steamer;

When a large volume of food is to be speedily defrosted, compressed steam at a high temperature is used. But such steam spoils the delicate taste of high grade food. Further, a steamer is not suitable for defrosting some kind of frozen food, such as fried food and tempra (Japanese fry), because dry hot blast is more suitable for them than steam or wet hot blast. Further high pressure steam at a high temperature spoils the flavor of food and defrosting with low pressure steam needs long time and has a small defrosting capacity.

c. an oven;

Many kinds of convection ovens are provided, but all of them have a low heat transfer rate and have no capacity of defrosting frozen food at one time in accordance with the kinds thereof.

As abovementioned, the conventional monofunctional defrosting machine causes frozen food to be unevenly defrosted. Thus the obtained defrosted food is untasteful, which unfavorably results in prevention of the spread of frozen food, the application of frozen food to mass feeding, restaurant management or the like.

The present invention provides a defrosting apparatus having functions of an electronic range, a steamer and an oven, which apparatus can efficiently defrost frozen food such as frozen rice food comprising a variety of materials each having different quality without providing unequal extent of defrosting and without losing original flavor of the food, and can continuously, speedily and efficiently defrost various kinds and a large amount of frozen food under the best condition in accordance with a menu.

A defrosting apparatus according to the present invention comprises a casing defining a chamber and provided with an inlet for putting the belowmentioned trays into said casing and an outlet so dimensioned as to take said trays one by one out of said casing, a number of trays for mounting various kinds and a large amount of frozen food thereon, a tray circulating system adapted to removably mounting said trays and to circulate said trays in said casing with each tray always in horizontal position, a cover consisting of a pair of half members provided in the upper portion of said casing and adapted to be opened during tray circulating operation so as not to prevent the circulation and to be closed when the circulation stops so as to define an enclosed chamber for enclosing predetermined one of said trays, a means for irradiating micro-wave onto said tray within said cover, a means for selectively forming an atmosphere of heated dry air, heated humid air or steam within said casing and a control means for making a predetermined one of circulating trays to reach just below said cover, closing said cover and irradiating micro-wave onto said tray enclosed by said cover for a required time.

Further, a defrosting apparatus according to the present invention may be provided with a means for irradiating infrared onto a tray enclosed by said cover and a means for spraying water onto said tray enclosed by said cover.

In a defrosting apparatus according to the present invention, the inlet provided on the casing is not only for putting trays into the casing but for affording an operator to enter the casing for the purpose of mending or inspection of the tray circulating system provided in the casing or cleaning a chamber in the casing, so that said inlet is at least so dimensioned as to afford a man to pass through.

Further, one of features of a defrosting apparatus according to the present invention is an outlet provided only for putting trays out of the casing. This outlet is for putting out trays which have been subject to the predetermined defrosting treatment one by one, and therefore it is dimensioned as small as possible in correspondence with the size of a tray so as to minimize the emission of heat out the casing. On the contrary, an outlet provided in a casing of the conventional defrosting apparatus is adapted to be used as an inlet for trays and therefore it is dimensioned rather large in comparison with the capacity of the casing. Therefore in the apparatus so constructed, most of heat within the casing emit therefrom through the opening at the time of taking trays out, and the predetermined temperature within the casing begins to drop suddenly. Thus, after taking trays out it takes a fairly long time to obtain the predetermined temperature in the casing again. The conventional defrosting apparatus is economically very disadvantageous because of the large amount of heat energy emission every time treated food is taken out and further because the apparatus stops its operation then, thus lowering the operation efficiency.

In a defrosting apparatus according to the present invention, the heat energy to be lost at the time of taking out of food is much less than that in the conventional apparatus, and the operation efficiency of the apparatus is very high with an improved economy.

Further, doors for the inlet and the outlet of an apparatus according to the present invention comprise such a member affording seeing the contents in the casing from outside respectively. An apparatus according to the present invention has the following treating functions.

I. A dielectric internal heating treatment
   This comprises a microwave irradiating process (A).
II. A radiant and/or conductive heating
   Heated dry air treatment (B)
   This heated dry air results from the air in the casing heated by a heating means.
   Heated humid air treatment (C)
   This results from water-spray heated by a heating means.
   Steaming treatment (D)
   This is steam produced by vaporization of the water supplied in the casing, or introduced from outside.
   Immersing in the hot water in the casing (E)
   Infrared irradiating process (F)

By properly combining abovementioned treatments (A), (B), (C), (D) and (E), unequality in defrosted extent and uneven formation of defrosted food can be completely overcome.

According to the present invention, the following combinations of defrosting methods can be achieved:

1. (A) + (B)
2. (A) + (C)
3. (A) + (D)
4. (A) + (C) + (E)
5. (A) + (B) + (F)
6. (A) + (C) + (F)
7. (A) + (D) + (F)
8. (A) + (C) + (E) + (F)

In a defrosting apparatus according to the present invention, the treating functions (B), (C), (D) and (E) are used for the primary defrosting of frozen food while (A) is for the secondary or finish defrosting. In other words, frozen food is primarily defrosted in the first step through external heating effect. In this case, frozen food can be uniformly and effectively defrosted even if temperature difference is present in the casing, since said frozen food are circulated by the tray circulating system. Then, only frozen food on the optionally selected one of the trays is put into the enclosed chamber of the cover, where said selected frozen food is completely defrosted by the secondary defrosting treatment with microwave energy.

Further in an apparatus according to the present invention, the infrared treatment (F) is applied to frozen food requiring to be baked on the surface thereof when eating. And frozen food in the enclosed chamber may be further applied with microwave and water spray during infrared irradiating.

In an apparatus according to the present invention, the various defrosting conditions 1–8 can be optionally and selectively set by the conventional means. When optionally required condition is set, frozen food on the trays is circulated for a predetermined time during which said food is subject to the primary defrosting treatment, and the said primarily defrosted frozen food is finally and completely defrosted without unevenness by means of microwave irradiator for a predetermined time in the enclosed chamber of the cover. By opening the door of the outlet, the defrosted food on the tray is taken out through the outlet. This outlet is provided separately from the inlet for trays and so dimensioned only to afford to take out a tray, the temperature in the casing can be effectively kept and the heat emission therefrom can be minimized, thus making the apparatus economical.

As abovementioned, an apparatus according to the present invention is provided with the primary defrosting functions (B)–(E) and the secondary defrosting function (A), by both of which frozen food with unevenness in formation thereof can be uniformly defrosted. In using the apparatus, only one of the primary and the secondary defrosting treatments can be independently applied. For example, frozen food such as Sashimi (raw fish), pudding or hors-d'oeuvre which need not be completely defrosted but need to be only half defrosted and left to be defrosted in the time before eating is sufficiently subject only to the defrosting treatment (A) of microwave irradiation. Further, in the primary defrosting treatment, treatments (B), (C), (D) and (E) are selectively applied in correspondence with the kind of dishes of frozen food.

Each of trays may be partly or entirely predeterminedly colored in accordance with the defrosting treatment condition to be applied to frozen food. On the other hand, a control means may be provided which has control buttons colored in the same color with the corresponding trays so as to set the defrosting condition relating to each of the colors. And further, doors of the outlet and the inlet of the casing may comprise a member affording to see the inside of the casing through said doors. With the abovementioned construction, it is unnecessary to confirm the content or frozen food at every time of operating the defrosting apparatus with the consideration of suitable defrosting condition. And only at a glance of the color of the tray, necessary defrosting condition can be decided, so that by operating a button colored similarly to the tray, necessary defrosting treatment is applied. In other words, before using the defrosting apparatus, various kinds and a large amount of frozen food is divided into a plural number of groups in accordance with defrosting conditions such as the suitable temperature of defrosted food when eating, and said frozen food in each group is mounted on a tray or trays predeterminedly colored in common in accordance with the defrosting condition of the group, and stored in a proper freezing chamber. Colors to be applied to the trays may be decided in the order of spectra of the light.

According to one embodiment of an apparatus of the present invention, a. Blue color is applied to frozen food which need not be completely defrosted but need only to be half defrosted and then subject to natural defrosting in the time before eating.

b. Green color is applied to frozen food which requires heating to room temperature.

c. Yellow color is applied to frozen food which requires heating above room temperature.

d. Red color is applied to frozen food which requires heating above (c).

The colors representing the abovementioned defrosting conditions (a)–(d) are decided ordinally with relation to the treating temperature for frozen food.

Trays colored in blue, green, yellow or red as abovementioned are divided on the basis of color representing the eating temperature, and contained within the casing in the order from the lower to the higher eating temperature. Further, each tray is provided a specified number or designation thereon. On the other hand, the buttons of the control device are provided the numeral representing the order of arrangement of the trays in correspondence therewith. Further, on the button (s) removably provided is a seeing-through color plate which is colored similarly to the colors applied to the trays (blue, green, yellow or red). The numerals on the buttons are visible through each of said color plate. Therefore, by operating buttons with seeing the colors representing eating temperature and the numbers, required frozen food can be rapidly and surely defrosted under the necessary defrosting conditions.

Other and further objects of this invention will become obvious upon an understanding of the illustrative embodiments about to be described or will be indicated in the appended claims, and various advantages not referred to herein will occur to one skilled in the art upon employment of the invention in practice.

FIG. 9 is another embodiment of a defrosting apparatus of the present invention;

FIG. 21 is a graph representing the relation between the lapse of time and the heating temperature in case of applying heating treatment both with an oven and magnetron micro-wave irradiation.

Figure 1:
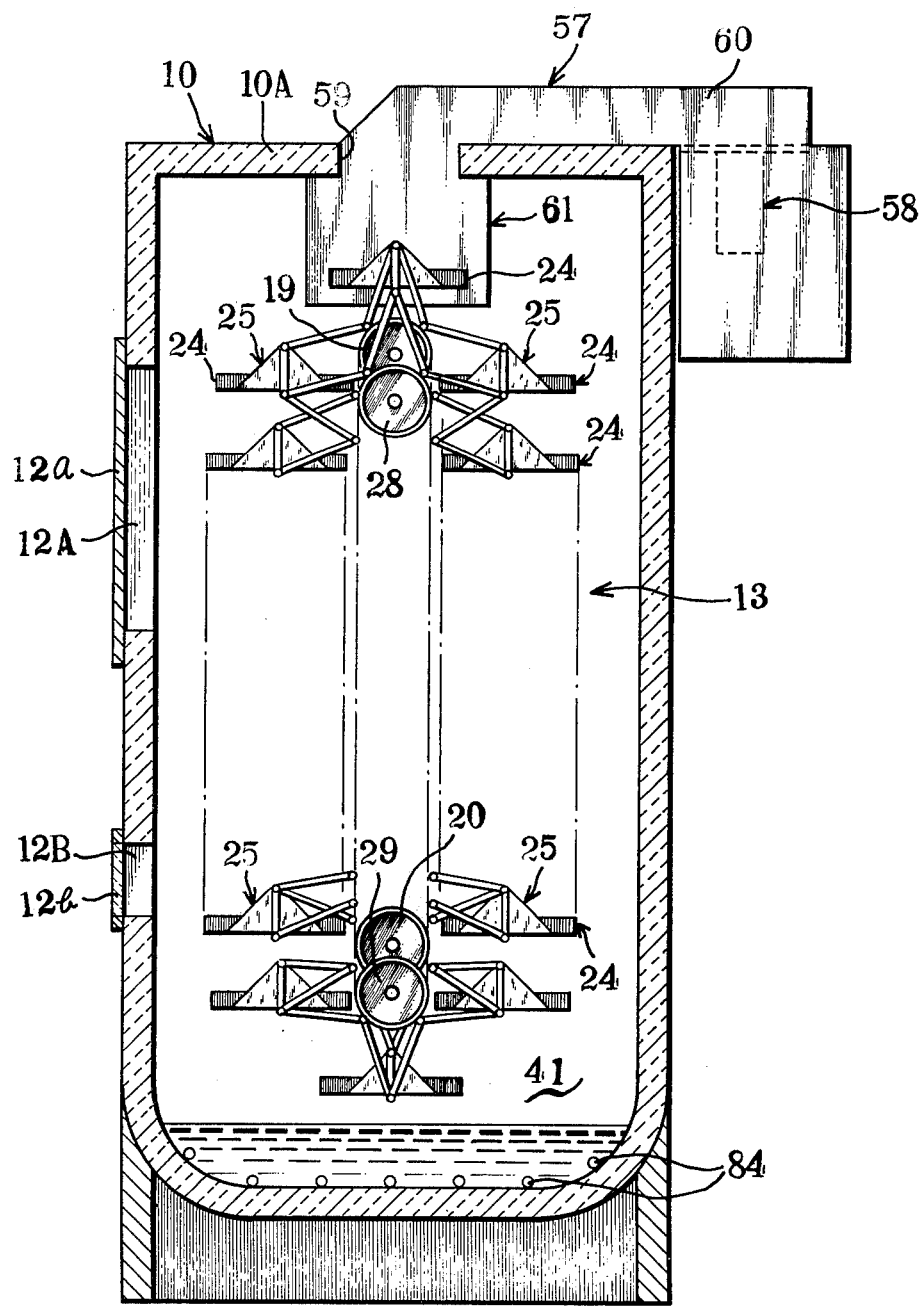
FIG. 1 is a sectional side view of an embodiment of a defrosting apparatus of the present invention.
Figure 2:
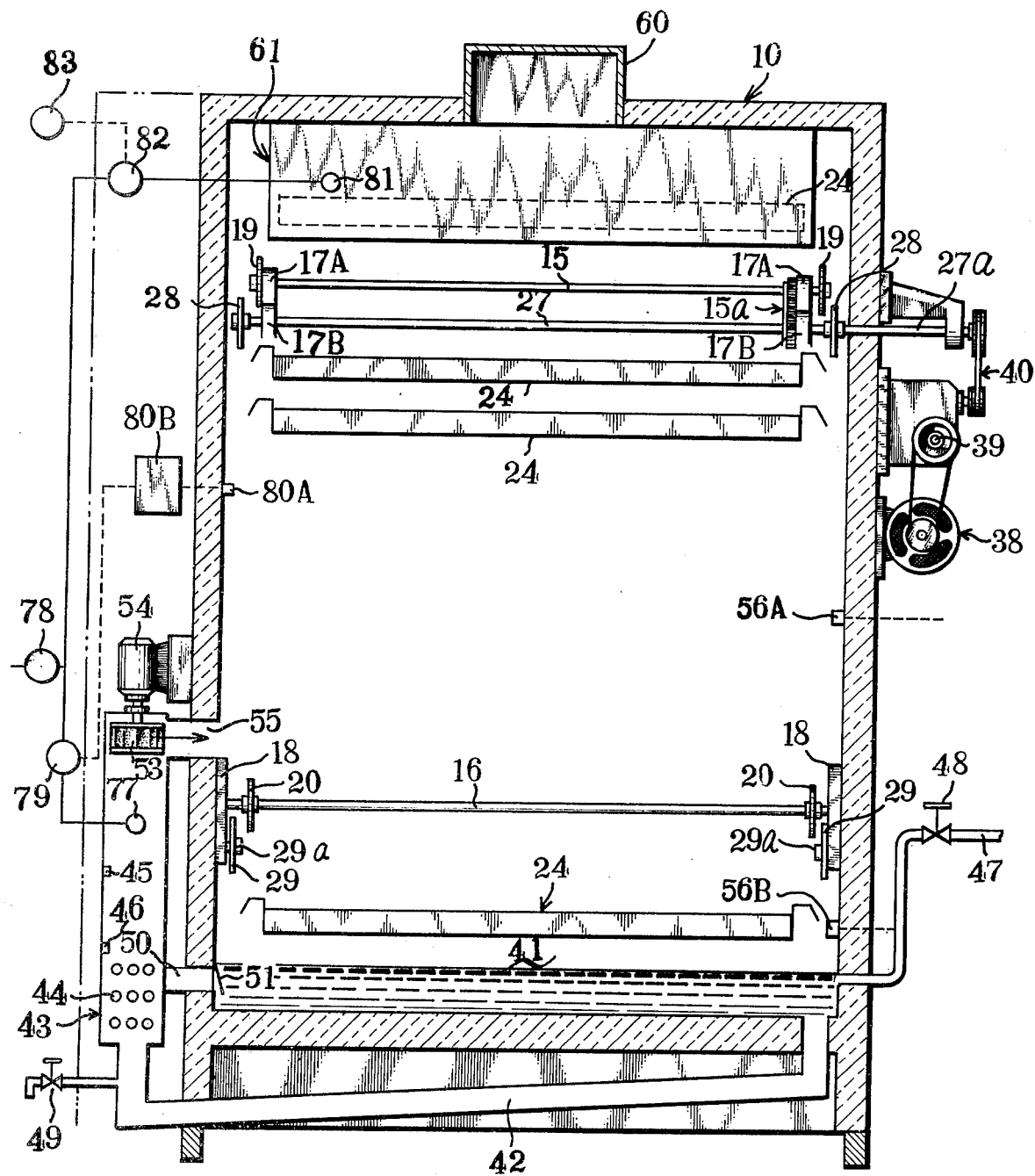
FIG. 2 is a vertical longitudinal sectional view of an apparatus of FIG. 1.

A defrosting apparatus according to the present invention is presented in FIG. 1 and FIG. 2 wherein reference numeral 10 indicates a casing inside which is formed a chamber. On the front wall of said casing provided are an inlet 12A for trays at the upper portion and an outlet 12B therefor at the lower portion, said outlet 12B being so dimensioned as affording to take out only one tray 24 mentioned below so as to minimize emission of heat from the casing 10. Said inlet 12A and outlet 12B have a door 12a or 12b respectively which is adapted to be opened and closed freely. Most part of said doors 12a and 12b is formed of the material affording to see the inside therethrough.

Figure 3:
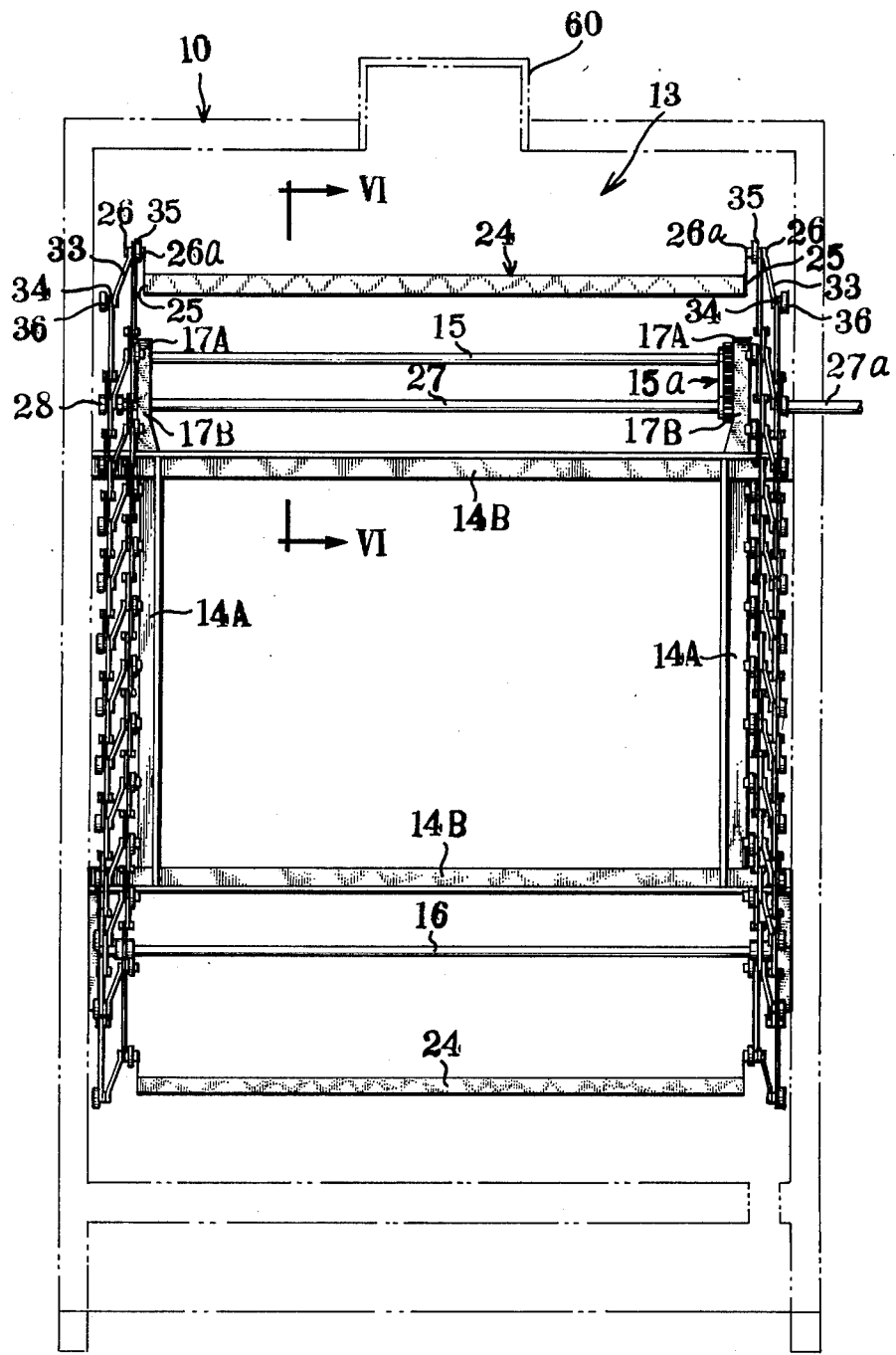
FIG. 3 is an elevational view in section of a tray circulating system in a defrosting apparatus of the present invention.

Disposed within the chamber of the body 10, is a tray circulating system 13 which is constructed so as to make a number of trays successively or intermittently circulate upwardly and downwardly with each tray always in horizontal position by means of belowmentioned suspending buckets. Disposed on said trays are many groups of food each of different condition for defrosting. There are shown detailed structures of the abovementioned tray circulating system in FIG. 3 to FIG. 6. With particular reference to FIG. 3, the tray circulating system 13 is arranged within the main casing 10 shown with a imaginary line. Disposed within the casing 10, locating at opposite sides thereof, are pair of vertical supporting frames 14A, 14A horizontally spaced from each other, on which are mounted a pair of horizontal supporting frames 14B, 14B vertically spaced from each other. Also disposed above the upper supporting frame 14B and below the lower supporting frame 14B, in parallel with said supporting frames, are two horizontal shafts 15, 16 respectively. As shown in FIG. 3, each of two end portions of the shaft 15 is rotatably journaled in a bearing 17A, and also each of two end portions of the shaft 16 is rotatably journaled in a bearing 18. Further, on each of two ends of the shaft 15 is mounted a sprocket 19. Also mounted on each of two ends of the shaft 16, is a sprocket 20.

Said one sprocket 19 mounted on one end of the shaft 15 and one sprocket 20 mounted on one end of the shaft 16 are of the same size, and these two sprockets 19, 20 form one of two pairs. One of each pair of sprockets 19, 20 is connected through a main endless chain 21 to the other.

Figure 6:
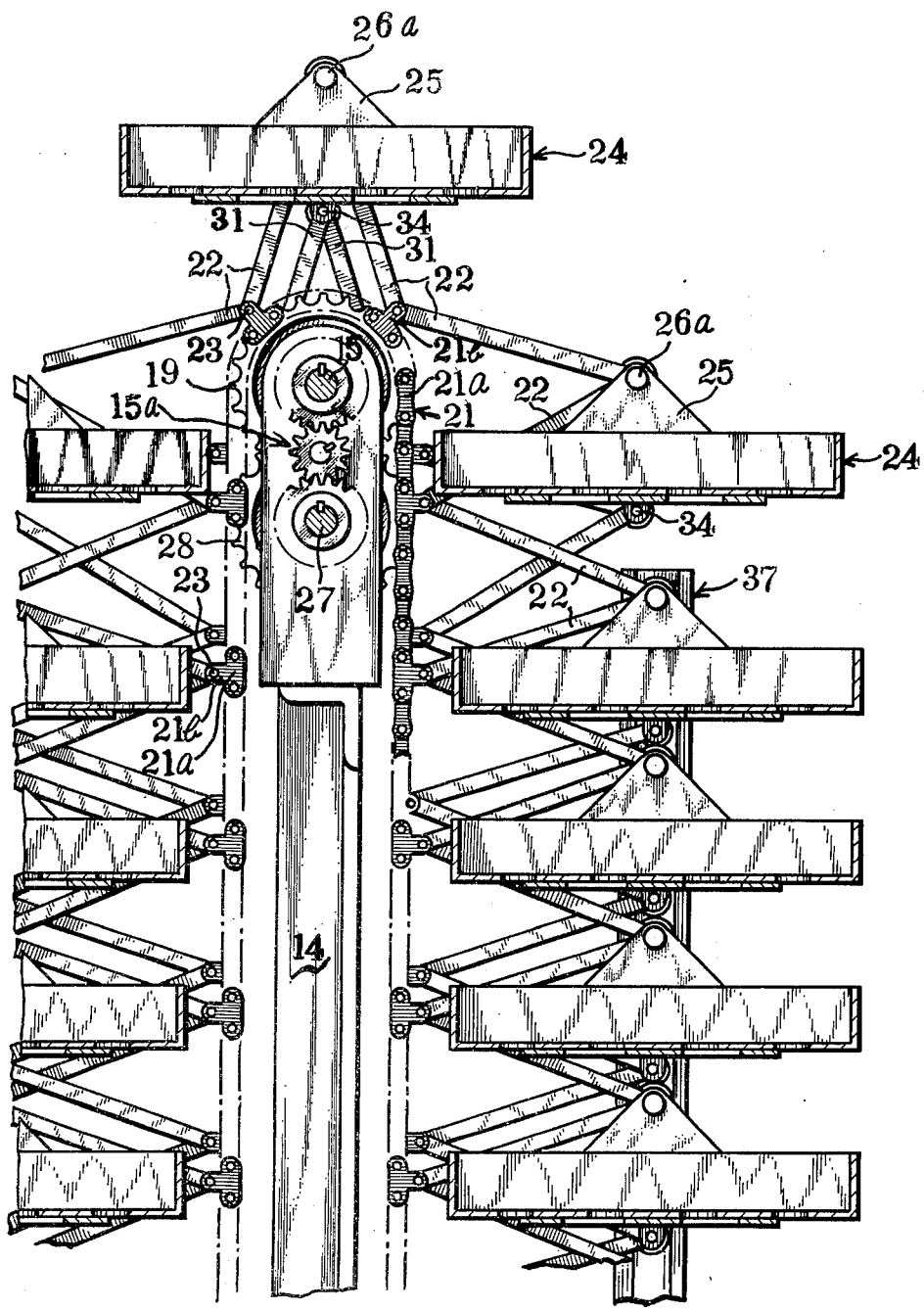
FIG. 6 is a fragmentary enlarged detailed sectional view of a system taken along the line VI—VI in FIG. 3.

As seen in FIG. 6, the main endless chain 21, which comprises a large number of links 21a interconnected through suitable pins, and on which a number of main supporting arms 22 are mounted through pivot pins 23 uniformly spaced from each other along the length of the chain 21. Each pivot pin 23 is held by a bearing member 21b secured to a suitably selected link 21a. Pivoted on the pivot pin 23 is two main supporting arms 22, one end portion of each of the two supporting arms 22 overlapping each other.

Figure 5:
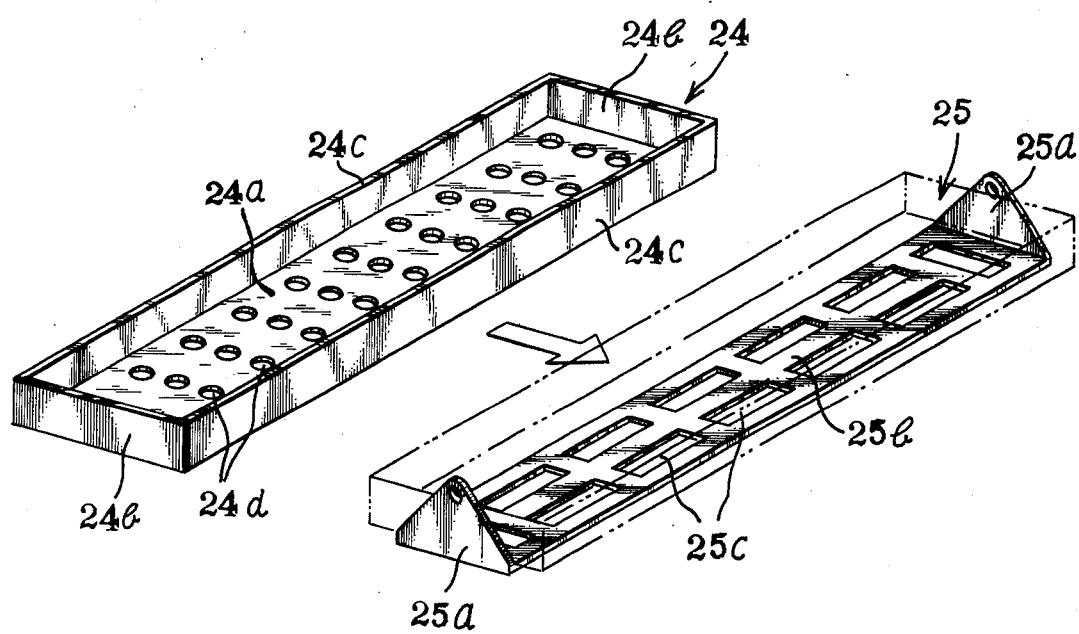
FIG. 5 is a perspective view of buckets and trays to be set in the buckets.

Numeral 24 indicates a tray which comprises a bottom plate 24a lateral side plates 24b, 24b and longitudinal side plates 24c, 24c as enlargedly shown in FIG. 5. Said tray 24 is adapted to be removably set in a suspending bucket 25 of the tray circulating system, said bucket 25 comprising a substantially triangular holding plates 25a, 25a and a supporting plate 25b. On the bottom plate 24a of each tray 24 and the supporting plate 25b of the bucket 25 provided are a number of air holes 24d, 25c respectively.

The outer end of one of a pair of supporting arms 22 and the outer end of one of another adjacent pair of supporting arms 23 are pivoted on the holding plates 25a, 25a of the suspending bucket 25 by means of a shaft 26, said two ends overlapping each other. These two supporting arms 22 pivoted on the pin 23 and a part of the main endless chain 21 form a triangle.

As shown in FIGS. 2, 3, disposed below the shaft 15 is a horizontal shaft 27, each end of which is journaled in a bearing 17B. Mounted on opposite end portions of the shaft 27 are two sprockets 28 of the same size as of the sprocket 19, and the former two sprockets 28 are vertically spaced from the latter.

The shaft 27 is connected to a driving shaft 27a adapted to be driven by means of an undermentioned driving unit. On the other hand, the shaft 27 is operatively connected through a gear assembly 15a to the shaft 15, so that said two shafts 27, 15 can rotate in the same direction and at the same speed.

As apparently seen in FIG. 2, provided rotatably through a 29a on lower inside portion of each of bearings 18 is a sprocket 29 of the same size as of the sprocket 20, the former being vertically spaced from the latter.

The distance between axises of sprockets 19, 28 is the same as between axises of sprockets 20, 29. The upper sprocket 28 is connected through an auxiliary endless chain 30 to the lower sprocket 29. The length of the auxiliary chain 30 is the same as of the main chain 21 extending between the sprockets 19, 20.

Figure 7A:
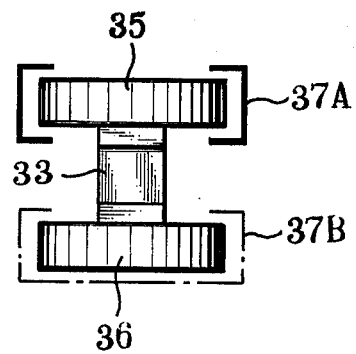
FIG. 7a is an enlarged sectional view taken along the line VII—VII in FIG. 7.
Figure 7:
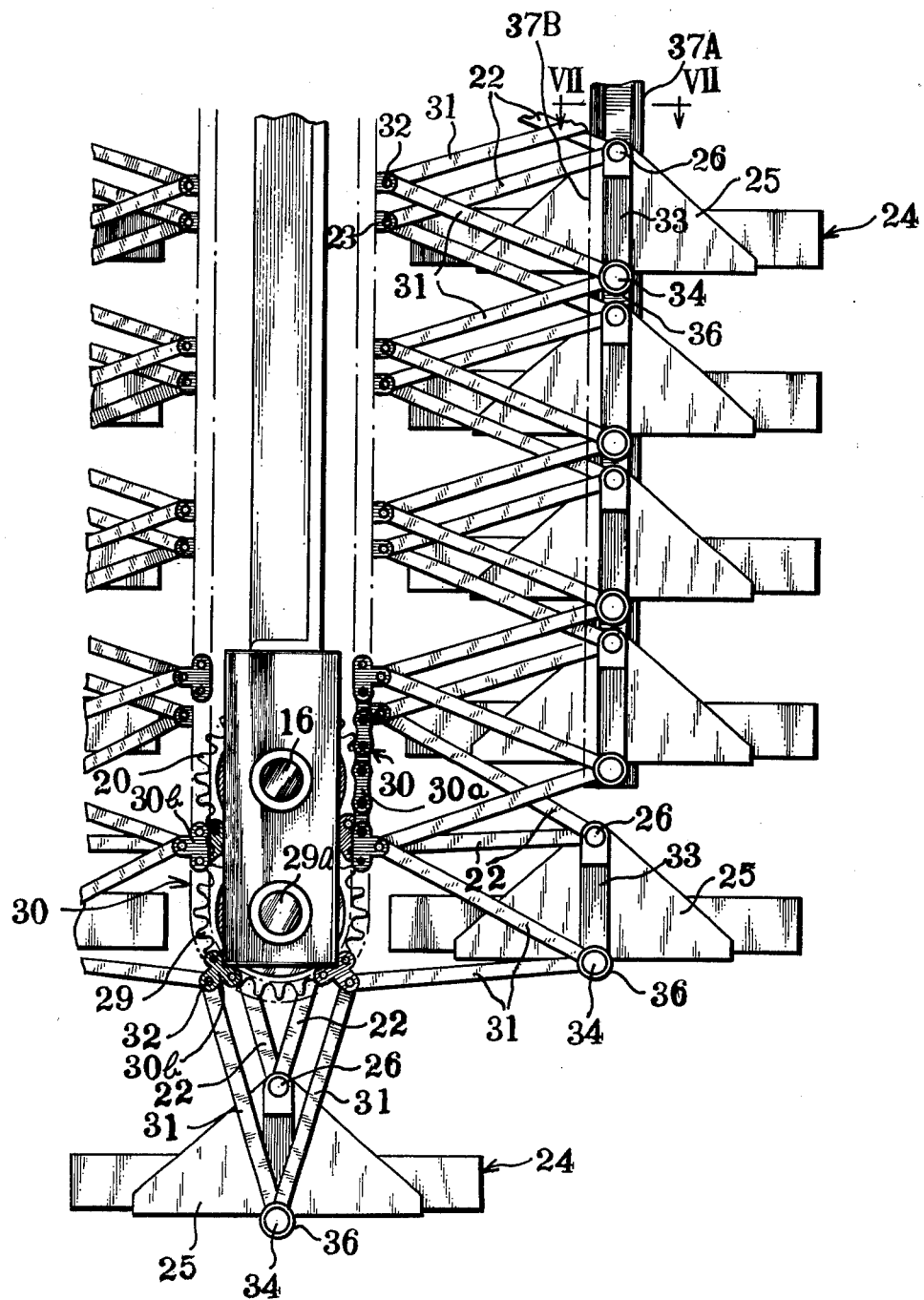
FIG. 7 is an enlarged detailed side view in section of the lower portion of a system of FIG. 3.

As apparently seen in FIG. 7, on the auxiliary endless chain 30 comprising a large number of links 30a interconnected through suitable pins, a number of auxiliary supporting arms 31 are pivoted by means of pivot pins 32 spaced from each other at a certain pitch along the length of the chain 30. Said auxiliary supporting arm 31 is rotatably held by a bearing member 30b which is integrally secured to a suitably selected link 30a. The distance between adjacent two pivot pins 32 of the auxiliary chain 30 is the same as between adjacent two pivot pins 23 of the main chain 21. One end of each supporting arm 31 is pivoted on the pivot pin 32, while other end is pivoted on a shaft 34. The shaft 34 is fixedly connected through a connecting member 33 to the shaft 26, that is, the upper end of the connecting member is mounted on the shaft 26, while the lower end is mounted on the shaft 34. Said connecting member 33 is adapted to be always in the vertical position.

The upper end of the connecting member 33 is integrally secured through the shaft 26 to the top portion of the holding plate 25, while the lower portion of the member 33 is spaced from the plate 25 as shown in FIG. 3. Mounted rotatably through the shaft 34 on the lower end portion of the member 33, are the outer end of one of two adjacent supporting arms 31 and that of the other. These two adjacent arms 31 and a part of the auxiliary chain 30 form a triangle. As mentioned above, two adjacent supporting arms 22 mounted on the main chain 21 and a part of said chain 21 form a triangle. Said two triangles belong to each tray 24. The length of the supporting arm 22 is the same as of the arm 31, while the distance between the pivot pins 23, 32 is the same as between the shafts 26, 34. Therefore, the lower one of two arms 22 belonging to a triangle is always parallel with the upper one of two arms 31 belonging to another triangle, and the connecting member 33 is also parallel with the main and auxiliary chain 21, 30.

Figure 4:
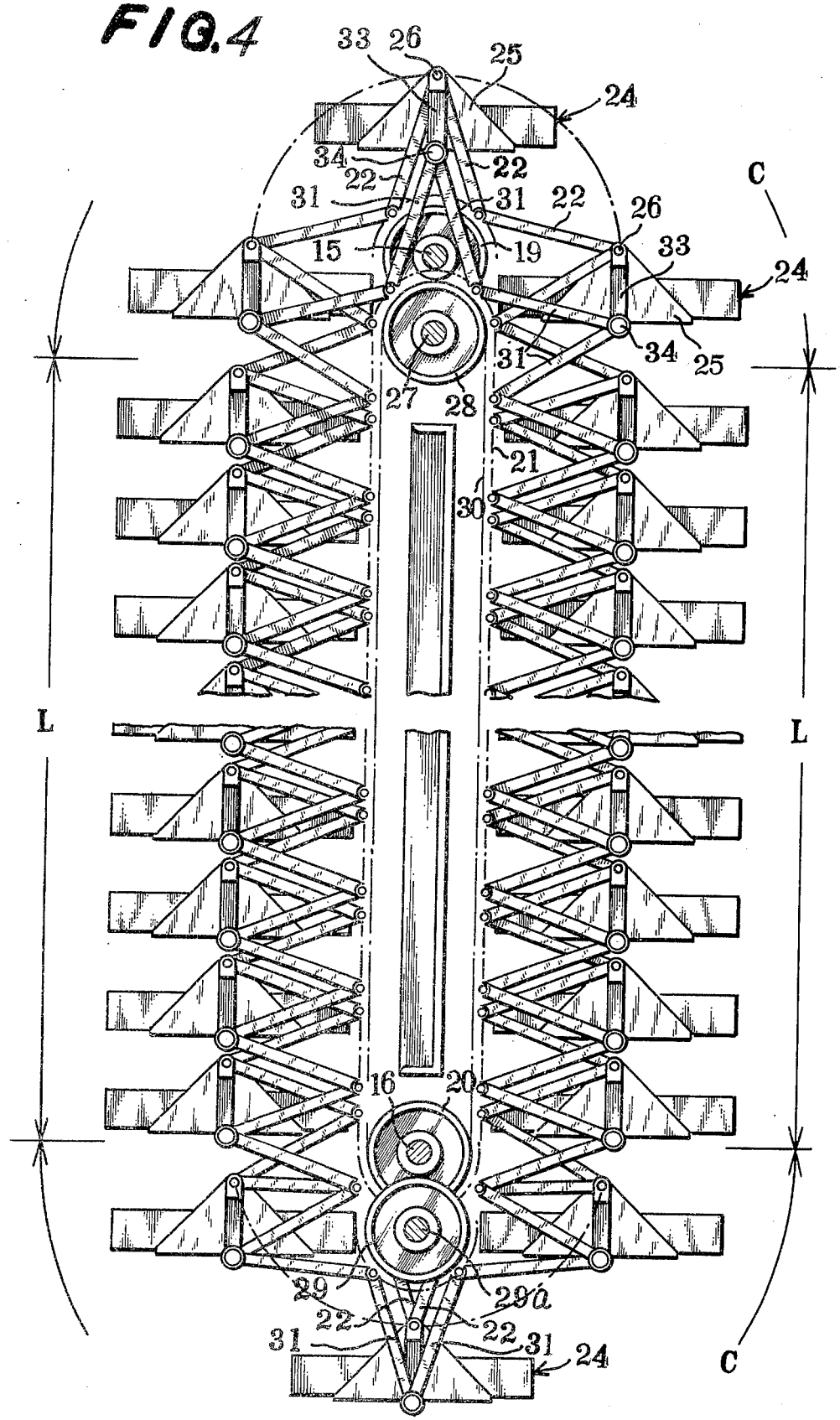
FIG. 4 is an enlarged side view in section of a system of FIG. 3.

Reference numeral 37A, 37B indicate an inner guide rail and an outer guide rail respectively. The inner guide rail 37A is adapted to guide a plurality of rollers 35, each roller 35 being rotatably mounted on the shaft 26. On the other hand, the outer guide rail 37B is adapted to guide a plurality of rollers 36, each roller 36 being rotatably mounted on the shaft 34. These guide rails 37A, 37B vertically extend parallel with the chains 21, 30. Each end of each rail is substantially limited at a boundary between a linear section L and a curve section C, as shown in FIG. 4. Therefore, in circulation of each bucket 25, the rollers 35, 36 thereof run off the guide rails 37A, 37B to be free at the curve section C.

The inner and the outer guide rails 37A, 37B are disclosed in an enlarged detailed sectional view of FIG. 7a.

As shown in FIG. 2, the casing 10 is provided at its outside with a driving motor 38 which is operatively connected through a reduction gear 39 and a transmission means 40 to the driving shaft.

In said tray circulating system 13, the shaft 26 is mounted on each of two holding plates 25a provided with the bucket 25, while the connecting member 33 is mounted at the upper end thereof on said shaft 26 so that the bucket 25 is integral with the connecting member 33, whereby said bucket is always in the horizontal position when said member 33 is in the vertical position. The two main supporting arms 22 and the two auxiliary supporting arms 31 are pivotally mounted on the upper or the lower portion of the connecting member 33 respectively, so that each tray 24 connected to said member 33 is always held in the horizontal position. The length of the main chain 21 is the same as that of the auxiliary chain 30, said main chain 21 being fitted with a pair of upper and lower sprockets 19, 20 while said auxiliary chain 30 being fitted with a pair of upper and lower sprockets 28, 29, each of said sprockets 19, 20, 28 and 29 being of the same size. A number of the main and the auxiliary supporting arms 22, 31 are pivotally mounted at uniform intervals on the main or the auxiliary chains 21, 30 respectively, said each supporting member 22 being pivotally mounted through the shaft 26 on the upper end portion of each connecting member 33, said each supporting arm 31 being pivotally mounted through the shaft 34 on the lower end portion of said connecting member 33, the distance between the two adjacent shaft 26, 34 being the same as that between the two adjacent shafts 15, 27 parallel with each other, whereby each connecting member 33 is always in the vertical position when each bucket 25 is situated at any section (namely at the linear section L or the curved section C), so that each bucket 25 is always kept in the horizontal position.

Each bucket 25 is kept in the horizontal position when the chains 21, 30 are vertical without guiding of the rails 37A, 37B for the rollers 35, 36.

If only the chains 21, 30 are in the vertical position, each bucket 25 can be kept in the horizontal position without the rollers 35, 36 being guided by the rails 37A, 37B. However, if no support means is provided at the linear sections L of the chains 21, 30, it is necessary for the guide rails 37A, 37B to guide the rollers 35, 36 so that the chains 21, 30 are not crooked under the influence of the loads of trays, arms and the like, and that each bucket 25 is kept in the horizontal position.

Of course, such guide rails 37A, 37B may be omitted when suitable support means are provided at the linear sections L of the chains 21, 30.

As shown in FIG. 1 and FIG. 2, defined within the casing 10 at the lower portion thereof, is a reservoir section 41 which communicates through a conduit 42 to a heat exchanger 43. The conduit 42 is connected at the one end portion thereof to a feed water pipe 47 to which is connected a suitable water source (not shown), said pipe 47 being provided at its required portion with a magnet valve 48. Disposed within the heat exchanger 43, are a sheathed heater 44 and two water-level detectors 45, 46 vertically spaced from each other. The magnet valve 48 is adapted to actuate under the control of said water-level detector 45 or 46 so that the predetermined quantity of water may be supplied into the conduit 42 and the reservoir 41. The conduit 42 is provided at its other end portion with an exhaust valve 49 for exhausting the water in the casing 10.

The heat exchanger 43 has a conduit 50 which is positioned below the water-level detectors 45, 46 and communicates with the reservoir section 41. Said conduit 50 is provided at the outer end thereof with a non-return valve 51 which is adapted to prevent the counter-flow from the reservoir to the heat exchanger 43.

Disposed on the top portion of the heat exchanger 43 are a fan 53 driven by a motor 54 and a duct 55 communicating with the interior of the casing 10. Mounted on the inside wall of the reservoir section 41 are thermostats 56A and 56B.

As disclosed in FIG. 1, provided at the upper portion of the casing 10, is a microwave irradiator 57 which comprises a magnetron 58 and a wave guide for guiding microwave, said wave guide extending from the magnetron 58 through an opening 59 formed in the upper wall 10A. Provided on the top wall 10A of the casing 10 is a cover 61 comprising two half members 61a, 61b which are adapted to freely open and close by means of a belowmentioned link mechanism. The cover 61 is opened in order not to prevent the movement of the trays 24 when they are circulating under the operation of the tray circulating system 13.

When one of the trays 24 comes to a required position by stopping of the circulation of the trays 24, the two half members 61a, 61b are closed through the link mechanism, and enclose said one tray 24. Then, the food on the enclosed-tray is irradiated with microwave by the microwave irradiator.

Figure 8:
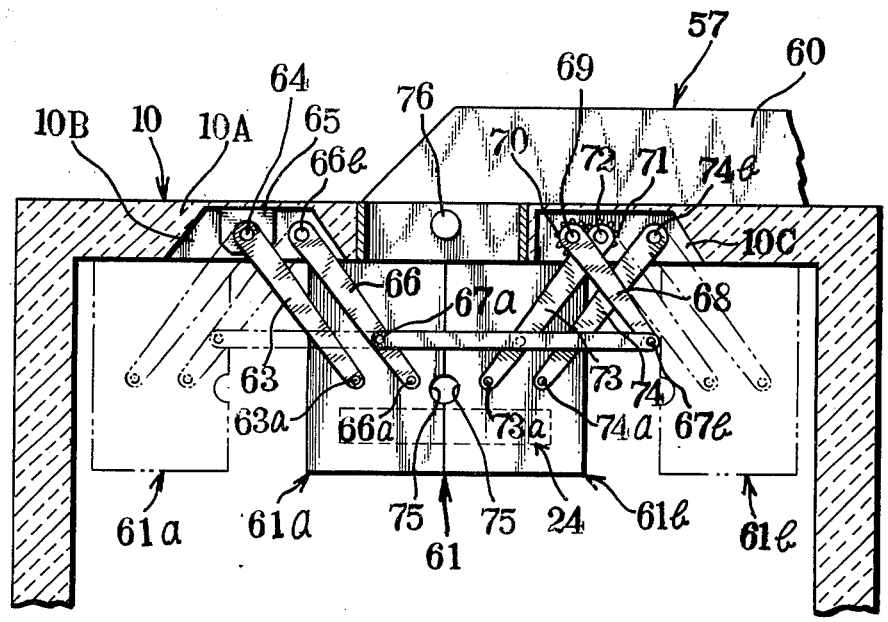
FIG. 8 is a fragmentary enlarged detailed view in section of the upper portion of a defrosting apparatus of the present invention.

In FIG. 8, an embodiment of the link mechanism is illustrated in detail. One end of a first lever 63 is pivotally mounted through a pin 63a on one half member 61a, while the other end is fixedly mounted on a driving shaft 64 which is supported by a bearing 65 provided in a recess 10B formed through the top wall 10A of the casing 10. The driving shaft 64 is operatively connected to a suitable pulsemotor (not shown). Also mounted pivotally on said half member 61a through a pin 66a, is one end of a first link member 66 of the same length as of the first lever 63. The other end of the first link member 66 is pivotally mounted through a pin 66b on the top wall 10A. In this arrangement, the first lever 62 is always parallel with the first link member 66.

Mounted pivotally on the lower end portion of the first link member 66 through a pin 67a, is one end of a second link member 67, the other end of which is pivotally connected through a pin 67b to one end of a third link member 68. The other end of the member 68 is fixedly mounted on a shaft 69 which is rotatably supported by a suitable bearing (not shown) provided in a recess 10C formed through the top wall 10A. Mounted fixedly on the shaft 69, is a first gear 70 meshing with a second gear 71. The second gear 71 is fixedly mounted a shaft 72 which is supported by a suitable bearing (not shown).

Mounted fixedly on the shaft 72, is one end of a fourth link member 73, the other end of which is pivotally mounted through a pin 73a on the half member 61b. Also mounted pivotally through a pin 74a on the half member 61b, is one end of a second lever 74, the other end of which is pivotally mounted through a pin 74b on the top wall 10A. The second lever 74 is the same length as of the fourth link member 73 and is always parallel with said member 73.

In operation of the abovementioned cover 61, when the pulsemotor actuates to turn the shaft 64 clockwise through a predetermined angle, the first lever 63 and the first link member 66 turn together about the respective pivot axises 64, 66b, whereby the half member 61 is moved to the leftest position as presented with the imaginary line. The turning of the first link member 66 causes through the second link member 67 the third link member 68 to turn clockwise through the same turning angle as that of the member 66. Such a clockwise turning of the third link member 68 causes through the first and second gears 70, 72 the fourth link member 73 turn anti-clockwise, whereby the half member 61b is moved to the rightest position as presented with the imaginary line.

Thus, as the first lever 63 is turned by means of the pulsemotor, the two half member 61a, 61b are moved away from each other to be opened.

On the contrary, when the pulsemotor actuates to cause the first lever 63 to turn anticlockwise, the two half members 61a, 61b are closed to define a chamber therein so as to isolate one of the trays from other trays.

The opening and closing operation of the two half member 61a, 61b, may be carried out by any other kind of mechanism operated by a suitable mechanical and-/or electrical driving means. For example, said two half members may be opened or closed by two hydraulically and synchronizedly operated cylinders each of which is mounted on each half member.

As disclosed in FIG. 8, provided at respective engaging portions of the two half members 61a, 61b are a pair of apertures 75, 75, so that the inwardly extending portion 26a of a shaft 26 carrying each holding plate 25 does not obstruct the closing operation of the half members, thereby a substantially enclosed chamber being defined.

Numeral 76 designates a hole perforated through the waveguide duct 60 in order to insert a water spray nozzle 81 for preventing excessive drying of frozen food surface during the microwave irradiation.

Numeral 77 indicates a spray nozzle positioned above the heater 44 for obtaining heated vapor, said nozzle being adapted to atomize the water introduced through an electromagnetic pump 78 and an electromagnetic valve 79. This atomized water is heated by the heater 44 to become the above mentioned "heated vapor" and is blown by the fan 53 into the casing.

Numeral 80A designates a humidistat provided at the inside wall of the casing 10, said humidistat 80A being connected through a humidity controller 80B to the valve 79. Also provided at the upper portion of the casing 10, is a water spray nozzle 81 adapted to be operated by opening and closing of an electromagnetic valve 82 to spray the water in the enclosed cover 61 for a predetermined time which is adjusted in use of a time 83.

In the abovementioned arrangements, the lower water-level detector 46 is actuated to lower the level of water in the reservoir section 41 to the position of said detector 46 and the heater is energized and the fan 53 rotated, whereby heated humid air is generated within the casing 10. The heated humid air is filled in the casing 10 whereby frozen food disposed on each tray 24 of the tray circulating system 13 is heated. In this case, the wet hot-blast is stirred up to be filled uniformly in the casing 10.

Thus, the frozen food is defrosted by said wet hot-blast with suitable moisture (a primary defrosting).

Thereafter, when the trays 24 circulate in the casing 10 and then one of the trays comes to the required position below the microwave irradiator 57, the two half member 61a, 61b of the cover 61 which are opened so far close each other to surround said tray 24.

Therefore the frozen food on the tray 24 within the cover 61 is irradiated with microwave generated from the magnetron 58. During the microwave irradiation, water spray is applied to the food on the tray 24. In this case, as said food is already subjected to the primary defrosting, a relatively shorter microwave irradiating time does not lessen the defrosting effect. Consequently, fully defrosted is frozen meat and the like which can be only insufficiently defrosted when heated with wet hot blast only.

As stated above, the frozen food contained in the casing 10 of the apparatus is subjected to two kinds of heat treating: one is the radiant and/or conductive heating (for example, with wet hot blast), and another is the dielectric internal heating with microwave.

Namely, applying a convection oven heating with dry hot blast jointly with a microwave irradiation with magnetron results in a multiplied effect, so that frozen food can be completely, uniformly and suitably defrosted without unevenness in heating and uneven formation thereof.

Therefore taste of defrosted food is not spoiled, and the like of magnetron which costs very high is kept longer because microwave irradiating time can be shortened. Further by applying wet hot blast to frozen food within the cover simultaneously with microwave irradiation, prevented is excessive drying of defrosted food surface which is generally occasioned during microwave irradiation.

When the exhaust valve 49 is opened to discharge completely the water in the casing namely in the reservoir 41, the conduit 41 and the heat exchanger 43 to make the heater 44 heat and the fan 53 is rotated, the air heated by the heater 44 is circulated as dry hot blast from the conduit 55 through the casing 10 to the conduit 42 and further to the heat exchanger 43. And by this dry hot blast heated is the food in the casing 10. Temperature of the hot wind is controlled by the thermostat 56A.

When water is sprayed through the nozzle 77 disposed in the heat exchanger 44, the sprayed water is heated to become heated vapor, which is circulated in the same manner as the dry hot blast, whereby the casing 10 is filled with the subject heated vapor. The food is defrosted under the presence of the heated vapor, and here applied with microwave by the magnetron in the same manner as said wet or dry hot blast to obtain multiplied effect.

Further, when the water level detector 45 is actuated to keep a regular quantity of water in the reservoir section 41 and the heater 44 is supplied with electric current to heat the water, the water in the reservoir section 41 is heated up to a predetermined temperature under the control of the thermostat 56B. Thus, the food on the lowest tray 24 of the tray circulating system 13 is dipped in hot or boiling water and, thereby, is subject to defrosting treatment. In this case, too, microwave irradiation by the magnetron can be applied jointly with said dipping treatment.

In the apparatus according to the present invention, as shown in FIG. 1, a multiplicity of sheathed heaters 84 may be provided on the bottom of the reservoir section 41. The heat exchanger 43 can be then eliminated but a fan may be provided on an appropriate portion in the casing 10 for circulating air, heated humid air, heated dry air or steam.

Said fan is provided particularly for circulating air, wet or dry hot blast, or heated vapor but not necessarily since the air, the wet hot blast or the heated vapor in the casing 10 is properly agitated by the circulating system which has a function of fan by itself.

The following is the results of defrosting experiments using defrosting apparatuses for realizing the method according to the present invention, especially the same apparatuses as described in the preceding examples embodying the present invention (shown in FIGS. 1–4).

EXAMPLE 1

Firstly the conventional defrosting method comprising dielectric internal heating by micro-wave irradiation is applied - Defrosting experiment (A), and secondly a defrosting method of the present invention comprising the combination of heating by a high temperature convection oven and a dielectric internal heating is applied, - Defrosting experiment (B), and then said two methods are compared with each other. In these experiments, a hamburger is used as a sample, namely, frozen food to be defrosted.

The sizes of the defrosting apparatus used in these experiments are as follows.

i. Outside measurements of the casing 2.12 m (width) × 2.0 m (height) × 1.0 m (depth)

ii. Inside measurements of the casing and capacity — 1.15 m (width) × 1.6 m (height) × 0.8 m (depth) = 1.47 m³ iii. Number of trays — 24
Measurement of a tray — 26 cm (width) × 80 cm (length)

Experiment (A) . . . microwave irradiation

24 Hamburgers (measurements of a piece, 8 cm (length) × 5 cm (width) × 1.6 cm (thickness), 80 g (weight) are disposed in four lines on one of the trays set in the tray circulating system in the defrosting apparatus, and said tray is enclosed by a cover of a microwave irradiator. Then the tray is irradiated with microwave by applying only magnetron, and temperature of the surface and the central portion of the hamburgers is measured with a thermistor thermometer every three minutes, the measured values being shown in Table 1. In this case, temperature of the inside of the defrosting apparatus was nearly 40°C.

Indications of the designations in Tables 1, 2 are hamburgers follows.

$n$ . . . number of the samples or hamburgers
$ts$ (°C) . . . surface temperature of a hamburger
$tc$ (°C) . . . temperature of the central portion (0.9 cm deep from the surface) of said hamburger
$Xi$ (°C) = $ts - tc$ ($ts > tc$) or
$tc - ts$ ($tc > ts$)
$\overline{ts}, \overline{tc}, \overline{Xi}$ . . . mean temperature of $ts$, $tc$, $Xi$ respectively
$\sigma$ . . . standard deviation
$\sigma = \sqrt{\Sigma(Xi - \overline{Xi})^2/n}$ This standard deviation indicates the extent of the scatter, and thereby the extent of unevenness in defrosting is estimated.

Experiment (B) . . . micro-wave irradiation + oven

The defrosting apparatus including the tray circulating system is previously operated, and the inside of the casing of the apparatus is heated up to about 180°C. Then a door of the casing of the apparatus is opened, and 24 frozen hamburgers of the same size as of those used in Experiment (A), in 4 lines on one of the trays of the tray circulating system as mentioned above with regard to Experiment (A), thereafter the door being closed. In this case, the chamber inside the casing of the apparatus is filled with dry hot blast, and the temperature thereof is kept to be about 180°C constantly.

After said hamburgers are put into the chamber, said tray on which the hamburgers are disposed, is substantially enclosed within a cover, and at the same time micro-wave irradiation by magnetron is applied to said tray about 3 minutes. After said first micro-wave irradiation is completed, temperatures of the surface and the central portion of the hamburgers are measured with the termistor thermometer. (The first temperature measurement.) Then said cover is opened, and said microwave irradiated hamburger pieces on the tray are circulated below a high temperature convection oven by dry hot blast in the casing of the apparatus. After said heating by dry hot blast is completed, the second temperature measurement is made (8 minutes after putting of the hamburger pieces in the chamber). Then these hamburgers are again enclosed within the cover and the second microwave irradiation is applied to the hamburgers for 3 minutes. After said second microwave irradiation is completed, the third temperature measurement is made 11 minutes after putting said hamburger pieces into the chamber). Data of the temperatures in the first, second and third measurements are shown in Table II which is similar to Table I.

Table 1-1

| sample number | Microwave irradiation after 3 minutes | | |
|---|---|---|---|
| | ts °C | tc °C | Xi °C |
| 1 | 2 | −4 | 6 |
| 2 | 1 | −5 | 6 |
| 3 | 10 | 17 | 7 |
| 4 | 5 | −4 | 9 |
| 5 | −2 | −5 | 7 |
| 6 | 4 | −3 | 7 |
| 7 | 5 | 6 | 1 |
| 8 | 8 | −3 | 11 |
| 9 | 1 | −4 | 5 |
| 10 | 4 | 1 | 3 |
| 11 | 2 | −5 | 7 |
| 12 | 9 | 22 | 13 |
| 13 | 19 | 15 | 4 |
| 14 | 3 | −4 | 7 |
| 15 | 5 | 1 | 4 |
| 16 | −2 | −5 | 3 |
| 17 | 2 | −3 | 5 |
| 18 | 1 | −4 | 5 |
| 19 | 2 | −2 | 4 |
| 20 | 3 | −4 | 7 |
| 21 | −1 | −5 | 4 |
| 22 | 19 | 10 | 9 |
| 23 | 5 | −3 | 8 |
| 24 | 16 | 21 | 5 |
| mean value | t̄s=5.04 | t̄c=1.25 | X̄i=6.4 σ=2.63 |

Table 1-2

| sample number | after 6 minutes | | |
|---|---|---|---|
| | ts °C | tc °C | Xi °C |
| 1 | 51 | 44 | 7 |
| 2 | 31 | 16 | 15 |
| 3 | 56 | 58 | 2 |
| 4 | 39 | 34 | 5 |
| 5 | 23 | 28 | 5 |
| 6 | 37 | 36 | 1 |
| 7 | 38 | 40 | 2 |
| 8 | 40 | 36 | 4 |
| 9 | 30 | 38 | 8 |
| 10 | 62 | 59 | 3 |
| 11 | 25 | 18 | 7 |
| 12 | 56 | 67 | 11 |
| 13 | 71 | 75 | 4 |
| 14 | 26 | 23 | 3 |
| 15 | 58 | 56 | 2 |
| 16 | 21 | 18 | 3 |
| 17 | 33 | 32 | 1 |
| 18 | 31 | 33 | 2 |
| 19 | 28 | 28 | 0 |
| 20 | 30 | 31 | 1 |
| 21 | 24 | 21 | 3 |
| 22 | 54 | 56 | 2 |
| 23 | 40 | 42 | 2 |
| 24 | 54 | 64 | 10 |
| mean value | t̄s=39.91 | t̄c=39.71 | X̄i=3.87 σ=4.07 |

Table 1-3

| sample number | after 9 minutes | | |
|---|---|---|---|
| | ts °C | tc °C | Xi °C |
| 1 | 84 | 76 | 8 |
| 2 | 66 | 61 | 5 |
| 3 | 84 | 76 | 8 |
| 4 | 70 | 62 | 8 |
| 5 | 65 | 62 | 3 |
| 6 | 68 | 64 | 4 |
| 7 | 64 | 62 | 2 |
| 8 | 73 | 63 | 10 |
| 9 | 57 | 53 | 4 |
| 10 | 81 | 63 | 18 |
| 11 | 54 | 58 | 4 |
| 12 | 87 | 82 | 5 |
| 13 | 84 | 83 | 1 |
| 14 | 68 | 64 | 4 |

Table 1-3-continued

| sample number | after 9 minutes | | |
|---|---|---|---|
| | ts °C | tc °C | Xi °C |
| 15 | 74 | 77 | 3 |
| 16 | 53 | 55 | 2 |
| 17 | 61 | 59 | 2 |
| 18 | 62 | 64 | 2 |
| 19 | 57 | 53 | 4 |
| 20 | 62 | 64 | 2 |
| 21 | 51 | 49 | 2 |
| 22 | 74 | 75 | 1 |
| 23 | 68 | 66 | 2 |
| 24 | 81 | 82 | 1 |
| mean value | t̄s=68.67 | t̄c=65.54 | X̄i=4.37 σ=3.74 |

Table 1-4

| sample number | after 12 minutes | | |
|---|---|---|---|
| | ts °C | tc °C | Xi °C |
| 1 | 88 | 84 | 4 |
| 2 | 80 | 78 | 2 |
| 3 | 89 | 85 | 4 |
| 4 | 81 | 83 | 2 |
| 5 | 80 | 76 | 4 |
| 6 | 86 | 79 | 7 |
| 7 | 78 | 75 | 3 |
| 8 | 83 | 66 | 17 |
| 9 | 72 | 67 | 5 |
| 10 | 74 | 79 | 5 |
| 11 | 69 | 68 | 1 |
| 12 | 82 | 82 | 0 |
| 13 | 83 | 87 | 4 |
| 14 | 76 | 75 | 1 |
| 15 | 76 | 83 | 7 |
| 16 | 69 | 71 | 2 |
| 17 | 73 | 76 | 3 |
| 18 | 81 | 79 | 2 |
| 19 | 74 | 67 | 3 |
| 20 | 73 | 75 | 2 |
| 21 | 68 | 66 | 2 |
| 22 | 77 | 80 | 3 |
| 23 | 71 | 73 | 2 |
| 24 | 82 | 82 | 0 |
| mean value | t̄s=77.71 | t̄c=76.50 | X̄i=3.54 σ=3.31 |

Table 2-1

| sample number | High temperature convection oven and microwave irradiation after 3 minutes | | |
|---|---|---|---|
| | ts °C | tc °C | Xi °C |
| 1 | 45 | 34 | 11 |
| 2 | 28 | 25 | 3 |
| 3 | 43 | 29 | 14 |
| 4 | 42 | 39 | 3 |
| 5 | 45 | 39 | 6 |
| 6 | 32 | 27 | 5 |
| 7 | 41 | 54 | 13 |
| 8 | 46 | 51 | 5 |
| 9 | 45 | 40 | 5 |
| 10 | 46 | 48 | 2 |
| 11 | 46 | 44 | 2 |
| 12 | 45 | 50 | 5 |
| 13 | 72 | 79 | 7 |
| 14 | 44 | — | — |
| 15 | 47 | 48 | 1 |
| 16 | 38 | — | — |
| 17 | 47 | 51 | 4 |
| 18 | 32 | — | — |
| 19 | 33 | 37 | 4 |
| 20 | 47 | — | — |
| 21 | 43 | 42 | 1 |
| 22 | 72 | — | — |
| 23 | 54 | 52 | 2 |
| 24 | 66 | — | — |
| mean value | t̄s=45.79 | t̄c=43.83 | X̄i=5.17 σ=3.77 |

Table 2 - 2

| sample number | after 8 minutes ts °C | after 8 minutes tc °C | Xi °C |
|---|---|---|---|
| 1 | 52 | 53 | 1 |
| 2 | — | — | — |
| 3 | — | — | — |
| 4 | — | — | — |
| 5 | 48 | 55 | 7 |
| 6 | — | — | — |
| 7 | — | — | — |
| 8 | — | — | — |
| 9 | — | — | — |
| 10 | — | — | — |
| 11 | 58 | 54 | 4 |
| 12 | — | — | — |
| 13 | 53 | 57 | 4 |
| 14 | — | — | — |
| 15 | 58 | 54 | 4 |
| 16 | — | — | — |
| 17 | 54 | 53 | 1 |
| 18 | — | — | — |
| 19 | 53 | 52 | 1 |
| 20 | — | — | — |
| 21 | 54 | 54 | 0 |
| 22 | — | — | — |
| 23 | 58 | 60 | 2 |
| 24 | — | — | — |
| mean value | t̄s=61.00 | t̄c=61.91 | X̄i=2.66 σ=2.02 |

Table 2 - 3

| sample number | after 11 minutes ts °C | after 11 minutes tc °C | Xi °C |
|---|---|---|---|
| 1 | 86 | 86 | 0 |
| 2 | 86 | 71 | 15 |
| 3 | 82 | 83 | 1 |
| 4 | 82 | 87 | 5 |
| 5 | 78 | 86 | 8 |
| 6 | 80 | 82 | 2 |
| 7 | 86 | 87 | 1 |
| 8 | 90 | 88 | 2 |
| 9 | 84 | 83 | 1 |
| 10 | 78 | 85 | 7 |
| 11 | 78 | 81 | 3 |
| 12 | 82 | 89 | 7 |
| 13 | 83 | 87 | 4 |
| 14 | 87 | 87 | 0 |
| 15 | 85 | 84 | 1 |
| 16 | 78 | 77 | 1 |
| 17 | 78 | 77 | 1 |
| 18 | 80 | 77 | 3 |
| 19 | 77 | 78 | 1 |
| 20 | 83 | 66 | 17 |
| 21 | 78 | 77 | 1 |
| 22 | 80 | 80 | 0 |
| 23 | 79 | 80 | 1 |
| 24 | 82 | 86 | 4 |
| mean value | t̄s=81.75 | t̄c=81.83 | X̄i=3.58 σ=4.25 |

Figure 18:
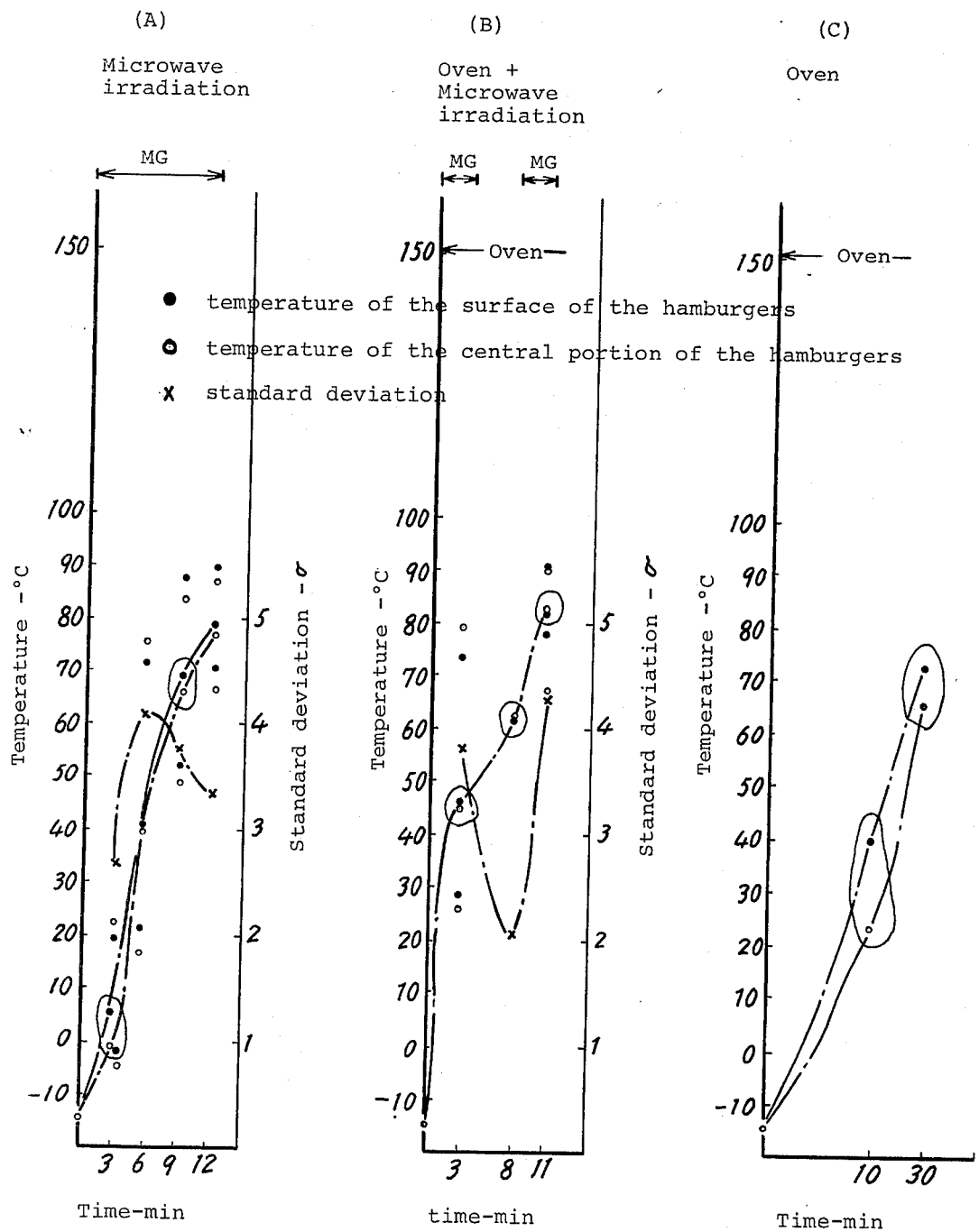
FIG. 18(A) is a graph representing the relation between the temperatures of the surface and the central portion of hamburgers and the standard deviation, and treating time in case of defrosting frozen hamburgers by only micro-wave irradiation by means of a defrosting apparatus according to the present invention.
FIG. 18(B) is a graph representing the relation between the temperatures of the surface and the central portion of hamburgers and the standard deviation, and treating time in case of defrosting frozen hamburgers by both of micro-wave irradiation and an oven.
FIG. 18(C) is a graph representing the relation between the temperatures of the surface and the central portion of hamburgers and treating time in case of defrosting frozen hamburgers only by an oven.

FIG. 18(A) and (B) are graphs plotting the maximum, mean and minimum values and the standard deviation of the measured values of heating temperatures (of the surface and the central portion of hamburgers) shown in Tables 1–1–1–4 and Tables 2–1–2–3, in which shown are the results of defrosting treatments each with only micro-wave irradiation and with both of micro-wave irradiation and heated dry air of a high temperature convection oven. And FIG. 18(C) is a graph representing for reference the relation between treating time and heating temperature in defrosting treating of frozen hamburgers only with heated dry air of a high temperature convection oven.

Firstly, the graphs 18(A) and 18(B) are compared with each other. Taking of the mean values, in the defrosting treatment only with micro-wave irradiation, the difference between the temperatures of the surface and the central portion of hamburgers is about 6°C after 3 minutes from the beginning of the treatment, and substantially no difference after 6 minutes, but 3°C and 2°C after 9 and 12 minutes respectively. On the contrary, in the defrosting treatment both with micro-wave irradiation and an oven, such temperature differences after 3, 8 and 11 minutes are about 2°C, 1°C and 0.1°C respectively, which involves that the difference is very small from the beginning of treatment and there becomes no difference with lapse of time. Nextly taking of the standard deviation, in the defrosting treatment only with micro-wave irradiation, the deviation is rather small as 2.3 after 3 minutes but becomes as large as 4.1–3.8 after 6 – 8 minutes. On the contrary, in the treatment both with micro-wave irradiation and an oven, the standard deviation is rather large as about 3.8 after 3 minutes, but as small as 2.0 after 8 minutes. From this, it is found that in the defrosting treatment both with micro-wave irradiation and an oven a very preferable result is obtained after about 8 minutes and then uneveness in defrosting extent (uneven in temperature) has been overcome.

On the other hand, referring to FIG. 18(C), the difference between the temperatures of the surface and the central portion of hamburgers does not become small with lapse of time and further it is as large as 8°–16°C throughout the whole defrosting period, and uneveness in defrosting extent has substantially not been overcome.

As apparent from the description above given with reference to FIGS. 18(A) (B) (C), unevenness in defrosting extent is not overcome by the defrosting treatment only with micro-wave irradiation or an oven, but it is substantially overcome by applying both of micro-wave irradiation and an oven. Especially, by the defrosting treatment with both of micro-wave irradiation and an oven, frozen food is defrosted and heated in a shorter time than in the treatment only with one of them, and further substantial micro-wave irradiating time is much shorter, thus being economically advantageous.

By thus combining a micro-wave irradiating means and an oven (which is an example of a radiant and conductive heating means and other means such as for applying heated humid air or steaming can be also used), such a remarkable advantage is obtained that unevenness in defrosting extent can be overcome. This results in that defrosted cooked food can taste as well as said food before freezing without change.

In the abovementioned defrosting experiments, hamburgers with rather uniform formation were used as samples because of being available and easy for measurement. And even in case of such hamburgers it is proved that combination of a micro-wave irradiating means and a radiant and conductive means can bring better defrosting results than the defrosting means of only one of them. Therefore, if a material with uneven formation such as curried rice as experimental samples, the abovementioned effects will appear more remarkably.

EXAMPLE 2

Using a defrosting apparatus similar to one used in Example 1, defrosting tests with only a high temperature convection oven (A'), with only magnetron microwave irradiation (A") and with both of the oven and the micro-wave irradiation (B') respectively are performed with respect to three kinds of samples — chawan-mushi (Japanese food), beef stew and curry roux. Chawan-mushi;

Stirred egg is added to soup seasoned with soy sauce or salt. Said soup with some ingredients such as sliced chicken, matsudake mashroom and kamaboko (boiled fish paste) is put into cups. Said cup is further vacuum-packed in a bag of polypropylene material and then frozen. Four trays each with four cups of said packed and frozen chawan-mushi thereon are prepared (The total number of the cups is 16). The net weight of a cup of chawan-mushi (excluding the weight of the cup) is 300 g.

Beef stew;

Small pieces of beef, potato, onion and others with some amount of water is cooked, vacuum-packed in polypropylene bags and frozen. Four trays each with four packs of beef stew thereon are prepared (the total number of the packs is 16). The weight of each pack is 300 g.

Curry roux;

Small pieces of beef, carrot and potato, green-peas and others with some water is boiled. Curry powder and flour is added thereto during boiling. Said curry roux is vacuum-packed in polypropylene bags and frozen. Four trays each with four packs of curry roux thereon are prepared (the total number of the packs are 16). The weight of each pack is 300 g.

Defrosting test (A') . . . oven

Figure 19:
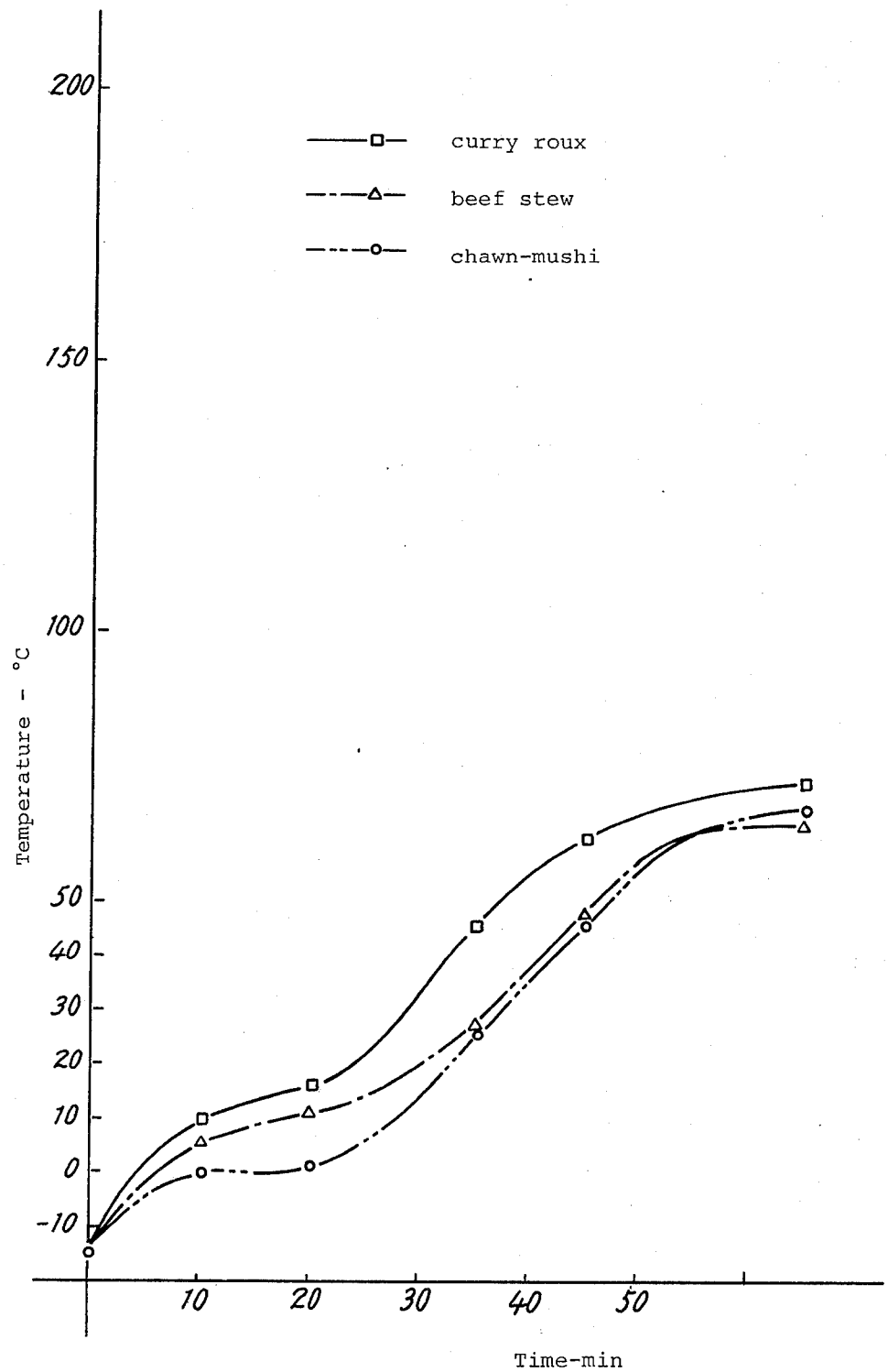
FIG. 19 is a graph representing the relation between the lapse of time and the heating temperature in case of applying heating treatment only with an oven to frozen food (chawan-mushi, beef stew and curried rice)

As atmosphere of heated dry air at a temperature of 100°C–120°C is kept in the casing, and there the tray circulating system is operated so that the abovementioned packs of chawan-mushi, beef stew and curry roux are circulated. The relation between the lapse of time and the temperature of the central portion of each sample is represented in the graph of FIG. 19. Defrosting Test (A'') . . . micro-wave irradiation The inside of the casing is kept at room temperature and the tray circulating system is operated so that trays with the samples thereon are intermittently put into the cover and subject to micro-wave irradiation for 3 minutes per one time. The relation between the lapse of time and the temperature of the central portion of each sample is represented in FIG. 20.

Defrosting test (B') . . . oven and micro-wave irradiation

An atmosphere of heated dry air at a temperature of about 100°C–120°C is kept in the casing. The tray circulating system is operated so that the trays with said samples thereon are intermittently put into the cover and subject to micro-wave irradiation for 3 minutes per one time. The relation between the lapse of time and the temperature of the central portion of each sample is represented in FIG. 21.

Figure 20:
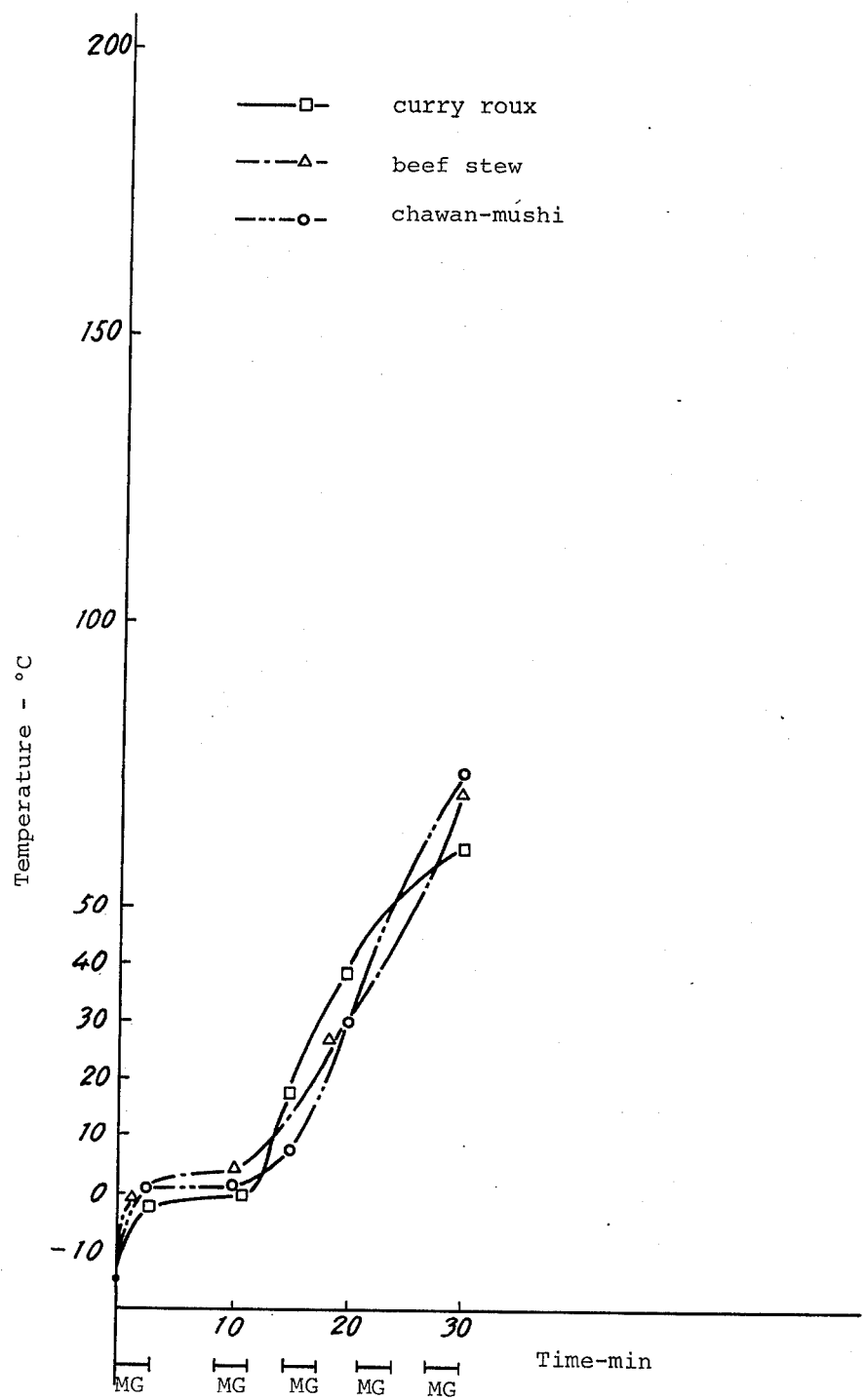
FIG. 20 is a graph representing the relation between the lapse of time and the heating temperature in case of applying heating treatment only with magnetron microwave irradiation.

Referring to FIGS. 19–21, the results of the tests are now put into consideration.

Chawan-mushi was heated to 1°C after 20 minutes' heating only with the oven as shown in FIG. 19 and to 30°C also after 20 minutes' heating only with micro-wave irradiation as shown in FIG. 20, while as shown in FIG. 21 it was heated to 78°C also after 20 minutes' heating with both of the oven and micro-wave irradiation. In other words, by combining the oven and micro-wave irradiation, the temperature (78°C) far above the sum of the temperatures in case of separately applying each of the two (1°C + 30°C = 31°C) was obtained through a multiplied effect.

After 20 minutes' heating, beef stew was heated to 11°C only with the oven and to 30°C only with micro-wave irradiation while it was heated to 60°C with both of the oven and micro-wave irradiation. Similarly, after 20 minutes, curry roux was heated to 15°C only with the oven and to 38°C only with micro-wave irradiation while it was heated to 71°C with both of them.

Precooked frozen food such as the abovementioned chawan-mushi, beef stew and curry roux, which have been difficult to defrost, were effectively defrosted in a very short time by a multiplied effect resulting from combining a radiant and conductive heating treatment with an oven and a dielectric internal heating treatment.

As apparent from Examples 1 and 2 above, a dielectric internal heating treatment and a radiant and conductive heating treatment such as with an oven are combinedly applied by means of a defrosting apparatus according to the present invention, precooked frozen food can be effectively defrosted without unevenness in defrosting extent and in a short time through so-called a defrosting effect including an unevenness eliminating effect and a heating temperature multiplied effect, whereby precooked frozen food can keep its taste before freezing unchanged.

Figure 10:
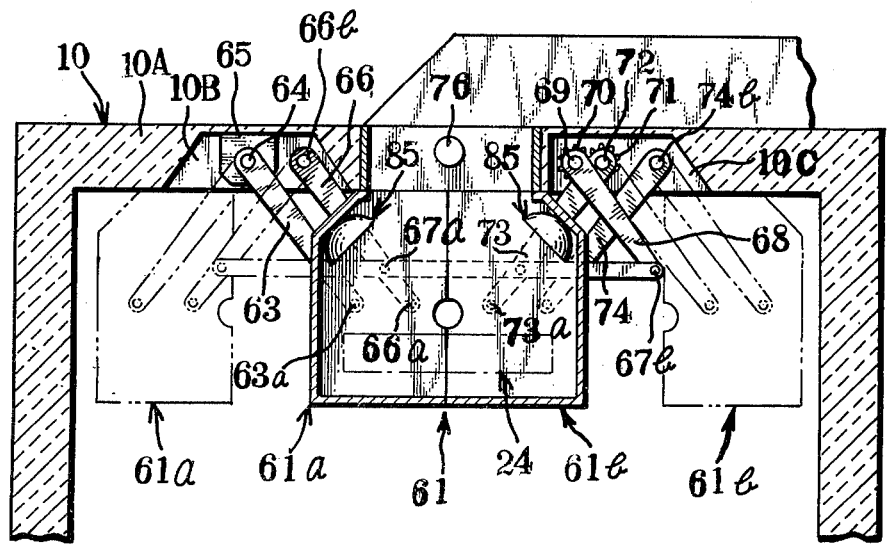
FIG. 10 is an enlarged detailed view in section of the upper portion of a defrosting apparatus of FIG. 9, illustrating an infrared irradiator within a cover.

By providing infrared in addition to the microwave irradiator 57 as shown in FIGS. 1, 2, this defrosting apparatus can be used as a roaster. In FIG. 10, a defrosting apparatus is shown, wherein two infrared irradiators or infrared heaters 85 are provided within the cover 61 of the microwave irradiator 57. Reference numerals of other parts of the defrosting apparatus in FIGS. 6, 7 are the same as of the corresponding parts in FIGS. 1, 2. With reference to FIG. 10, each of infrared irradiators 85 is fixed to each of the half members 61a, 61b forming the cover 61 in such a position as to irradiate frozen food to be defrosted.

After one of the trays 24 is stopped between the two half members 61a, 61b in open state, said two half members are closed with perfectly enclosing said tray 24. Said infrared irradiators 85 are respectively adapted to irradiate frozen food on said tray 24 when it is enclosed within the cover as abovementioned. And the micro-wave irradiator 57 is adapted to irradiate said frozen food simultaneously with abovementioned infrared irradiation. In this case, the infrared irradiator may be adapted to operate on detecting the position where the cover 61 is closed.

In this case the position of the cover 61 being closed may be detected by a limit switch (not shown), and thereby the infrared irradiator 85 and the micro-wave irradiator are adapted to operate.

Infrared irradiation to frozen food by ingrared irradiator 85 may be applied either simultaneously with micro-wave irradiation by the micro-wave irradiator 57 or separately therefrom. For example, when a tray 24 is stopped in a required position and said cover 61 is closed, infrared irradiation is applied to the frozen food sealed within the cover for a required time, and then the micro-wave irradiator begins to operate to irradiate.

An exhaust duct 86 and a suction blower 87 are provided for exhausting smoke generated from said food in infrared irradiation by infrared irradiators 85 out of the sealed chamber inside the cover 61. (FIG. 6)

Defrosting apparatus including infrared irradiators shown FIG. 10 have the same structure as of defrosting apparatus shown in FIGS. 1–5, except abovementioned infrared irradiator and the accessories thereof, so that details of said structure are not referred to.

As abovementioned, in the preceding embodiment of the present invention, there are also provided within said body defrosting means or preheating means for heating frozen food with wet or dry hot blast, or heated steam prior to said infrared irradiation, therefore frozen food can be reheated by the infrared irradiator after being defrosted effectively enough to keep quality thereof, so that extremely effective reheating is achieved without spoiling taste of the food. Thus the potentiative action of said preheating means and said infrared irradiator can eliminate difficulty in defrosting and further achieve more effective reheating.

In an apparatus of the present invention, as trays are adapted to be circulated in the casing, wet or dry hot blast, or heated steam which is a primary defrosting or preheating medium is uniformly spread within the casing of the apparatus, so that frozen food is accurately and effectively defrosted and preheated at any position in the casing.

In the following operation of an apparatus of the present invention, especially of the abovementioned second embodiment thereof is described with reference to to FIGS. 10–15.

Defrosting functions belonging to an apparatus of the present invention are stated again as follows.

I. A dielectric internal heating treatment
   A micro-wave irradiating process — (A)
II. A radiant heat transmission heating treatment (B)–(F)
   A heated dry air process — (B)
   A heated humid air process (C)
   A stream process (D)
   A dipping process (E)
   An infrared irradiating process (F)

As mentioned in the preceding description, these processes are combined in accordance with the kind of frozen food to be defrosted, forming a series of treating processes. In said series of treating processes, each process except an infrared irradiating process (F) does not go with each other but after one process is completed another one follows. Therefore if items checked and set such as for selecting, confirming or fixing in each process are previously known, said items are checked before beginning of each process, and then said process is begun by turning on a main switch. In this case, a suitable timer means may be provided for turning on a main switch after a predetermined time and at the same time operating an annunciator. Each process is similarly carried out in succession, then said series of processes being completed.

For example, for a defrosting process comprising a heated dry air process (B), a steam process (D) and a micro-wave irradiating process combined in this order, the following operation is carried out.

Firstly, items checked and set are carried out.
Secondly, a main switch is turned on.
Thirdly, the main switch is turned off after a required time.
Fourthly, items checked and set for a steam process (D) are carried out.
Fifthly, the main switch is turned on.
Sixthly, the main switch is turned off after a required time.
Seventhly, items checked and set for micro-wave irradiating process are carried out.
Eighthly the main switch is turned on.
And ninethly the main switch is turned off after a required time.

In this operation, a required time is to be predetermined and a timer is set according thereto, but it is more convenient that the time is further manually adjustable in observing the process of food to be treated.

Said items checked and set are described as follows. The items checked and set of the defrosting method of the present invention comprises the following seven kinds of control systems.

Figure 11:
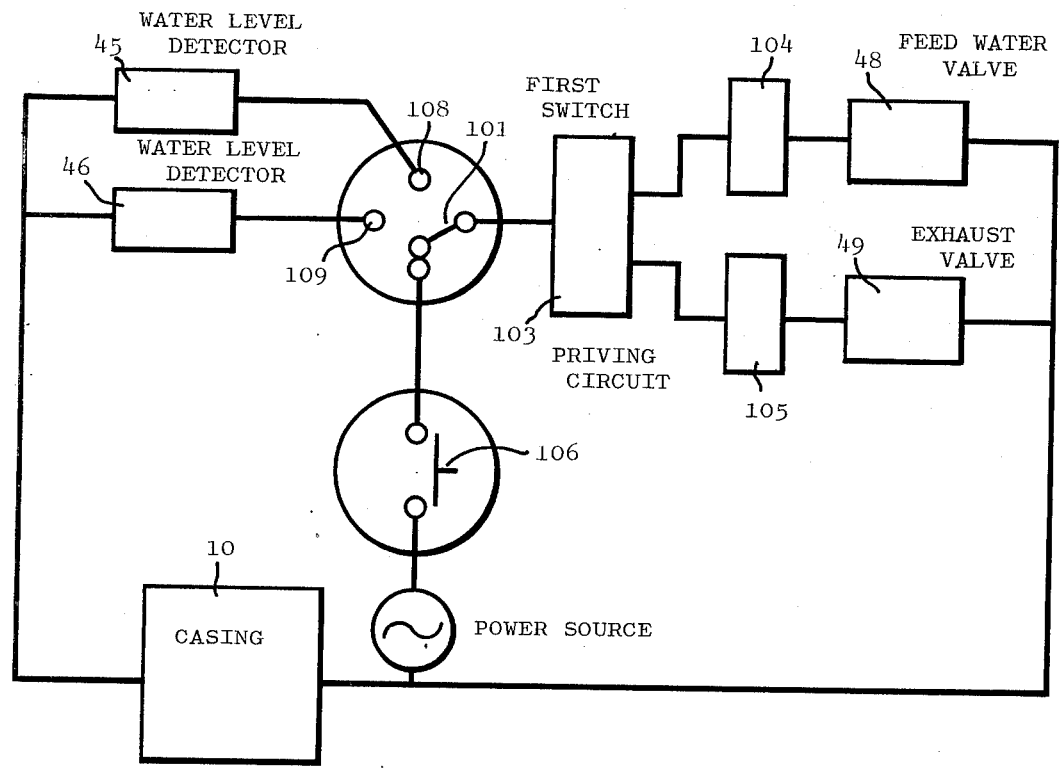
FIG. 11 is a block schematic diagram of a water-supply and drainage controlling system.

They are
(I) A water supply and draining control system
(II) A temperature and moisture control system
(III) A tray circulating system control system
(IV) A treatment time control system
(V) A specified tray calling control system
(VI) A water atomization control system
(VII) An infrared irradiation control system (I) Water supply and drain control system (see FIG. 11)

As abovementioned, on the lower inwall of the casing 10 of the defrosting apparatus are provided a high water level detector 45 in the upper portion and a low water level detector 46 in the lower portion, said two water level detectors being both connected to a magnetic valve 48 for water supply and a magnetic valve 49 for draining. On the control panel 99 a first change-over switch 101 in which said connection is changeable to the high water level position, the low water level position or the draining position in accordance with the kind of the process selected. If the first change-over switch 101 is connected to the high water level position 108, the high water level detector 45 actuates during defrosting, whereby for example, through a driving circuit 103, relays 104, 105 and a switch 106, magnetic valves 48, 49 are operated to keep water level constantly at the position of said detector 45. And if the first change-over switch 101 is connected to the low water level position 109, similarly water level is kept constantly at the position of the low water level detector 45.

Further, if water is not required, for example, in case of said heated dry air process (B) said first change-over switch is connected to the draining position 110, whereby said magnetic valve 48 for water supply is closed and said magnetic valve 49 for draining is opened, while said two detectors 45, 46 are disconnected. Said change-over switch 101 may be adapted to be manually connected to the draining position. If the electric current flows into the sheathed heater 44, said heater 44 is damaged, so that it is necessary to open the door and wait till the heater is dried. In this case, the first water supply and draining must precede turning on the main switch 111, and therefore it is necessary to flow the electric current into said heater by means of a switch 111 in a circuit other than that of the main switch 111.

Figure 12:
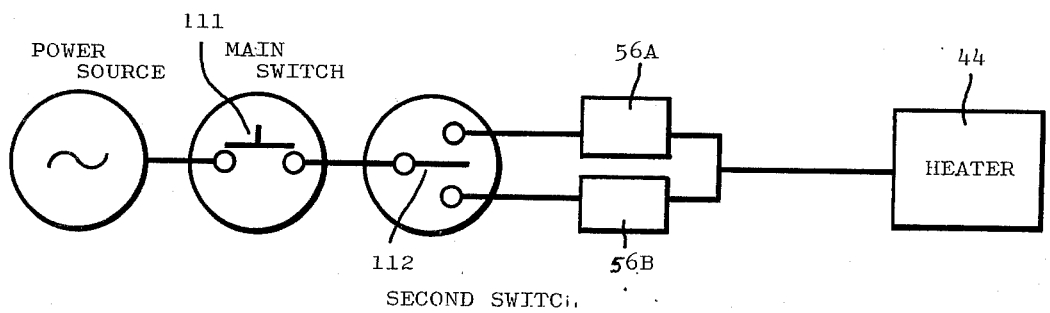
FIGS. 12, 13 are a temperature or a moisture controlling system respectively.
Figure 13:
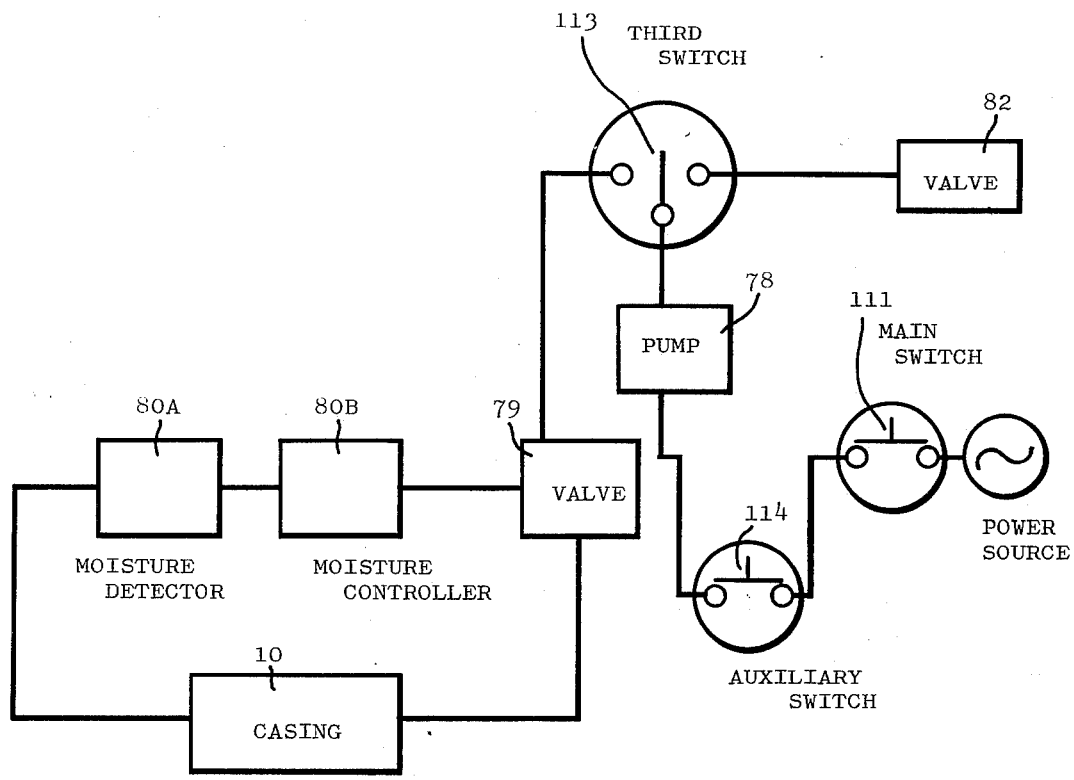

(II) A temperature and moisture control system (see FIGS. 12, 13)

On the side wall of the casing 10 of the defrosting apparatus, there are provided a thermostat 56A in the position suitable for obtain the substantially the mean temperature inside the body, and another thermostat 56B in the position suitable for measuring water temperature when said water level is high, said two thermostats 56A, 56B being connected to said sheathed heater 44. Said thermostats 56A, 56B may be adapted to take a suitable range of temperature, and in accordance with said range, the electric current is flowed in or shut out of the sheathed heater 44. Further the thermostats 56A, 56B are connected to the sheathed heater 44 by circuit changing in a second change-over switch 112 in accordance with the defrosting process selected. Said thermostats 56A, 56B may be replaced by a more precise thermocouple and a temperature controller connected thereto for controlling the sheathed heater 44. Further on the sidewall of the body 10, a moisture indicator 80A is provided, and a moisture controller 80B is provided on the control panel 99 for controlling a magnetic valve 79 to keep moisture inside the casing at the predetermined value.

Said valve 79 is connected to a pump 78, and said pump 78 is connected to the main switch 111. Further a magnetic valve 82 of the water spray nozzle 81 mentioned below is also connected to the pump 78. Connection of the magnetic valves 79, 82 to the pump 82 are changeable by operating a third change-over switch 113 in accordance with the defrosting process.

Further an auxiliary switch 114 is provided between the pump 78 and the main switch 111, and thereby, it is possible if required in the defrosting process to prevent the electric current from flowing into the pump when the main switch 111 is on.

Figure 14:
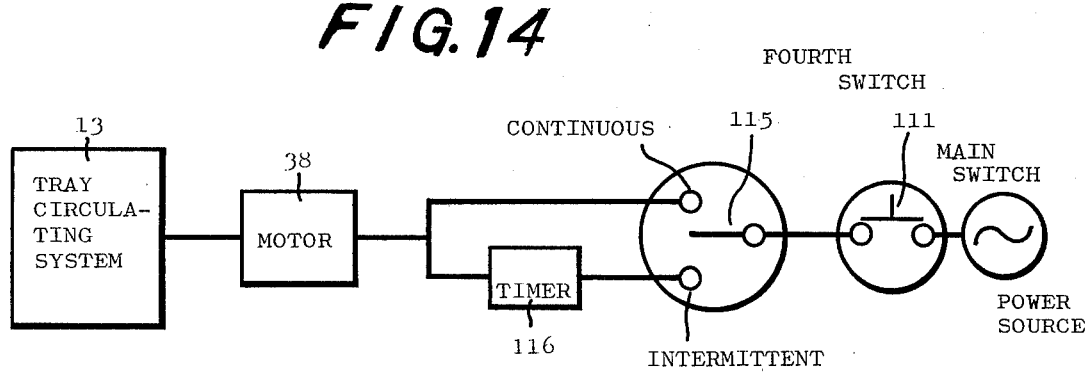
FIG. 14 is a block schematic diagram of a drive controlling system for a tray circulating system.

(III) A control system for a tray circulating system (see FIG. 14)

Trays in the tray circulating system has to be circulated by a motor either continuously or intermittently in accordance with a defrosting process selected. For example, in a defrosting method comprising a heated dry air process (B), a heated humid air process (C) and a steam process (D); said circulation may be uniformly continuous at the same time for stirring inside the casing. But in a dipping process or a microwave irradiating process, trays must be kept still in hot or boiled-water or in the position for micro-wave irradiation for a predetermined time.

Figure 15:
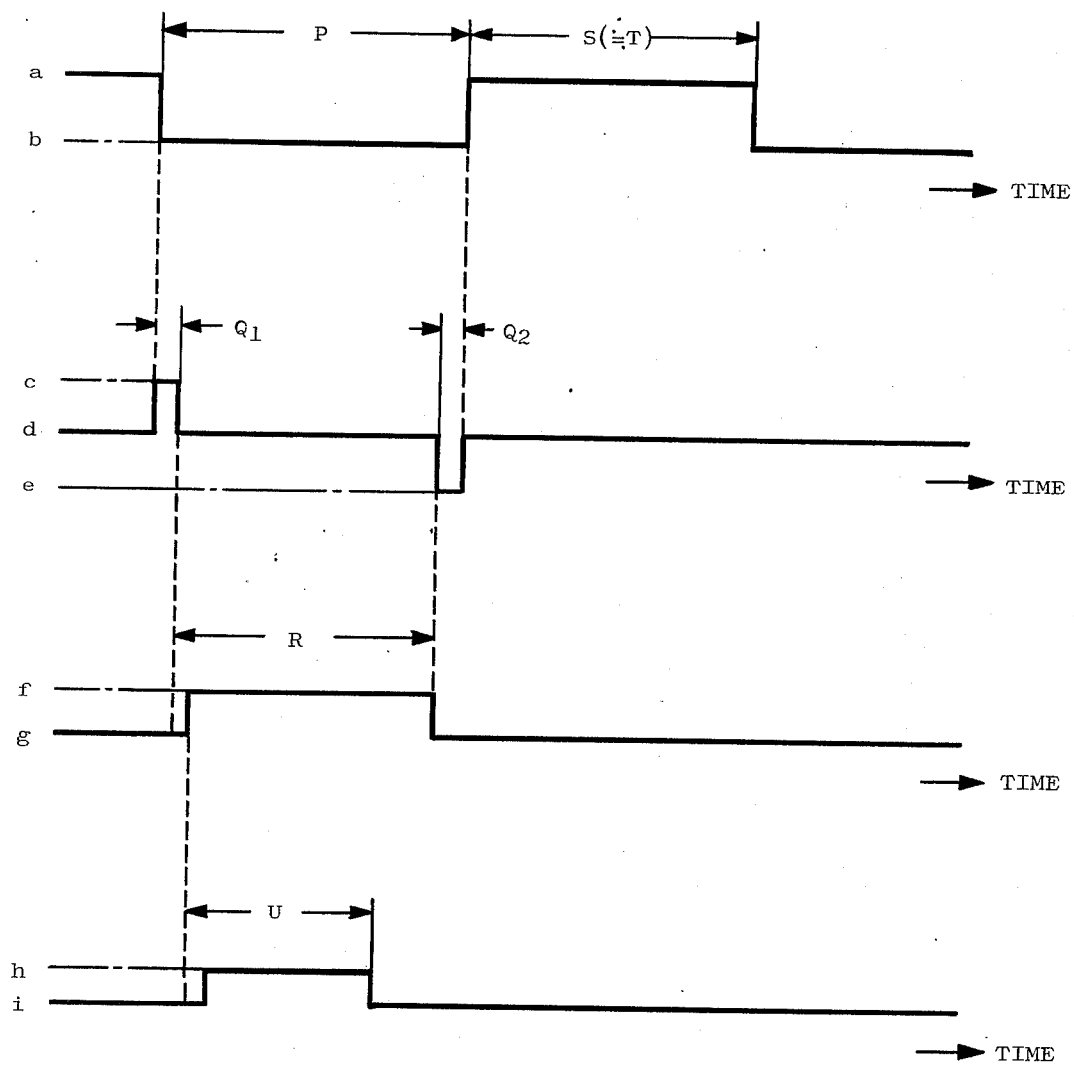
FIG. 15 is a schematic diagram illustrating the operating process of a motor for driving a tray circulating system, a pulse motor for driving a cover opening and closing means, a microwave irradiator and a water spraying means.
Figure 16:
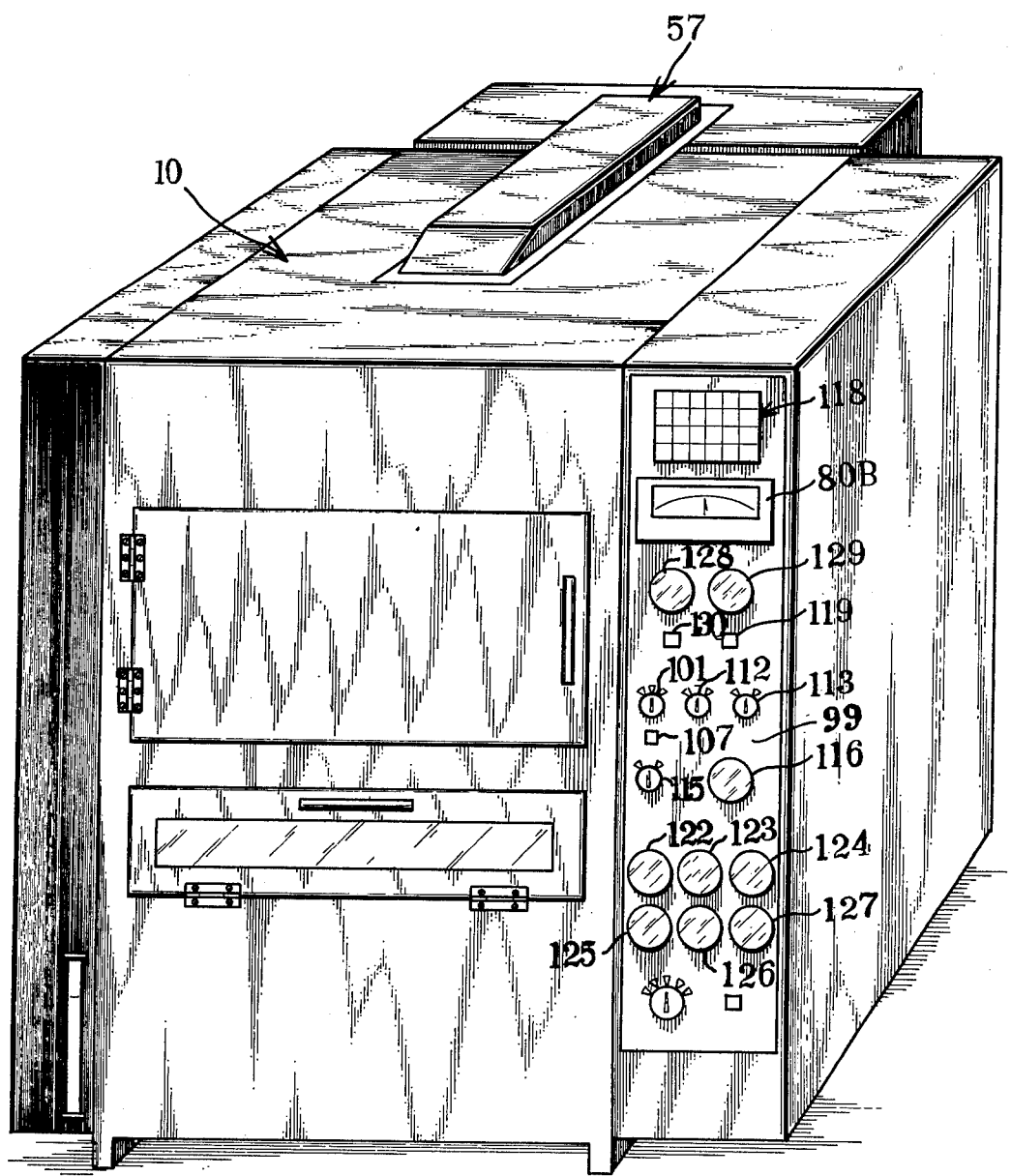
FIG. 16 is a perspective view of a defrosting apparatus of the present invention illustrating the outline thereof, especially a control panel for automatic control.

A continuous circulation and an intermittent circulation can be changed over by a fourth change-over switch 115. Said intermittent circulation with required cycles can be realized by providing a cycling timer 116. However, if the number of kinds of intermittent cycles required for the frozen food to be defrosted is previously known, said number of timers 116 are provided in parallel, whereby in accordance with the kind of frozen food to be defrosted said fourth change-over switch 115 has only to be changed over. Referring to FIG. 15, an interrupting time P in an intermittent cycle is necessarily decided by a time $Q = Q_1 + Q_2$ for opening and closing the cover 61 through operation of said pulse motor (not shown) and a micro-wave irradiating time R practically however, said interrupting time P is decided a little longer than (Q + R) by using a delay timer 127 at R. Operating time S in the intermittent cycle is time required for a tray of the tray circulating system to move a pitch. Further a specified tray can be surely stopped at the predetermined position by providing at a suitable position a limit switch connected to said motor 38.

Further, another limit switch is provided on said cover 61 which is adapted to be turned on by opening of said cover 61 and said micro-wave irradiation is caused by switching on said limit switch. Said pulse motor is adpated to reversely rotate on finishing of micro-wave irradiation.

In FIG. 15, a indicates operation of the motor 38, b, stop of the motor 38, c, positive movement of the pulse motor, d, stop of the pulse motor, e, reverse movement of the pulse motor, f, micro-wave irradiation, g, stop of micro-wave irradiation, and h and i indicate operation and stop of water spray respectively.

(IV) Treatment time control system

Treatment time required for each defrosting process depends upon the kind of frozen food to be defrosted, and therefore it is convenient to connect a timer to the main switch 111 and set the timer at a required time for treatment before carrying out a process. In this case, by using an automatic reset timer required treatment time may be reset before the beginning of each process, or by providing a plural number of timers 122–127 in parallel circuit may be turned on at a fifth changeover switch 117 according to a process selected. A water atomizing process and an infrared irradiating process are cZrried out simultaneously with a micro-wave irradiating process as explained with reference to FIG. 15.

(V) A tray calling control system

The present control system is for the case when all the trays of a tray circulating system are not used, or when frozen food to be defrosted on all the trays are not of the same kind. However, in a heated dry air process (B), a heated wet air process (C) and a steam process (D), all the trays are continuously circulated in the casing, and therefore the tray calling control system is not applied. That is, this control system is for calling a tray carrying frozen food to be defrosted thereon to the predetermined position in the beginning of a dipping process (E) or a micro-wave irradiating process (A). And this control is realized by providing a detecting means such as a limit switch, or a proximity switch on all the trays or a specified tray and at the same time providing means for catching and then giving signals made at said detecting means. When each of the trays 24 of the tray circulating system 13 is provided with a said detecting means, by pushing on a specific numbered button of a group of buttons on the control panel 99, the detecting means of the corresponding tray actuates, causing said motor 38 to drive, whereby all the trays are continuously circulated. If the fourth change-over switch 115 has been turned on to the intermittent position, said trays in continuous circulation stop on arriving of said specified tray at the predetermined position, and then said detecting means are switched off. In this case, the motor 38 may be a double speed change motor, and said motor 38 may be adapted to turn in the higher speed during tray calling. When said detecting means is provided only on a specified tray, the motor 38 may be actuated by pushing one of a group of buttons corresponding to said tray number, which gives a detecting signal including the distance between the tray corresponding to said pushed button and said specified tray besides the detecting signal by said detecting means.

(VI) A water atomizing control system (see FIG. 15)

Water atomizing is applied for preventing excessive drying of frozen food surface to be defrosted. This purpose can be realized by synchronizing said water atomizing with, for example, the beginning or the finishing or micro-wave irradiation.

Water atomizing time can be fixed as required by using a delay timer as a water atomizing timer 128. By providing an auxiliary switch 130 on the control panel 99, said water atomizing process can be carried out independently of other treating process.

(VII) An infrared irradiating control system

An infrared irradiating process is a finishing process for suitably scorching the surface of food to be defrosted. Therefore said infrared irradiation is carried out at latest after said water atomizing process, if the latter is applied. Said infrared irradiating process is adapted to synchronize with the micro-wave irradiating process by pushing a button 119 for infrared irradiation. If said button 119 is pushed, the infrared irradiating process does not start till the water atomizing timer is turned off. Further if the infrared irradiating process has not finished when the micro-wave irradiating process is completed, said timer 125 gives an alerting signal to said pulse motor, and the pulse motor is actuated on finishing of the infrared irradiation in order to open said cover 61.

Numeral 153 indicates an operating device provided with operating buttons on the operating plate of the defrosting apparatus A. On these buttons represented are a series of numerals or designations indicating the arrangement order of the trays arranged the circulating system and at the same time they are colored with colors similar to the colors of the corresponding trays classified on the basis of eating temperature.

When the operating device is adapted to set one of defrosting conditions only by a single operating button, for example, when these defrosting conditions comprise micro-wave irradiation as dielectric internal heating treatment and these conditions are different only in the length of the time of micro-wave irradiation, the buttons for setting each defrosting conditions are colored in the same color with the corresponding trays respectively. In other words, when frozen food are divided into three groups comprising (a) cool food which requires heating only to comparatively low temperature-below room temperature, (b) room temperature food which requires heating to room temperature and (c) hot food which requires heating to comparatively hot temperature above room temperature, the trays containing these food are colored in three different colors and the buttons in the operating device are colored in such a manner that referring to FIG. 17, the button 153a is colored in blue for indication of cool food, the button 153b in green for room temperature food and 153c in yellow for hot food whereby the defrosting conditions are combined with these operating buttons. If the operating device is not mono-functional, and an operator has to operate a plurality of positions of the device, only some specified members in each defrosting operation, for example, the buttons 153a, 153 b and 153c, the steam valve and the like are colored in the same color with the tray.

Numeral 154 indicates a dial display means for confirming which tray is now enclosed in the cover adapted to be freely opened and closed especially when dielectric internal heating treatment is applied in the defrosting apparatus.

In order to defrost frozen food by means of said trays 24 colored in correspondence with the defrosting condition and the defrosting apparatus A, for example, frozen food is mounted on trays colored in correspondence with the required defrosting condition and stored in group for each day in a storage box 150. Then the trays are taken out on respective day by opening a door 151 of the storage box 150, and transported manually or by means of a belt conveyer 152 to the defrosting apparatus A. In this case, the trays are closely piled up from the lower portion to the upper portion, but the operator can take out necessary trays from the upper or intermediate shalf with the knowledge, by one side of the tray face to outside of the storage box, what kind of frozen food is contained in the tray he is taking out and what defrosting condition is needed for said frozen food. Therefore, he can rapidly take out the necessary tray without confirming the content of the tray and while preventing cool air from emitting away from the storage box. Further, when another tray of some frozen food is needed in defrosting operation, said frozen food is obtained by taking out a tray of the corresponding color.

If the trays transported to the defrosting apparatus A are of the same kind or in the same color, they are put through the inlet into the apparatus A and set in a suspended bucket of the tray circulating system, so that defrosting operation can be started only by pushing the operating button colored similarly to the trays.

If the trays transported to the defrosting apparatus A are of a plurality of groups, for example, two kinds, each kind of trays is set in the tray circulating system in each group respectively. And if one group of frozen food requires treatments with humid air and of micro-wave irradiation and the other requires only a treatment with humid air, humid air treatment is applied to the two groups of frozen food at the same time by pushing an appropriate setting panel. Thereafter, the predeterminedly defrosted latter group of frozen food on the trays are taken out one by one through the outlet 12B, and then by operating a required setting panel micro-wave is irradiated onto said trays one after another. In the micro-wave irradiation, the numeral of the tray enclosed in the cover is represented on the display means 154 each time. The trays containing defrosted food are similarly taken out one after another through the outlet 12B.

Thus, by partly or wholly coloring each tray in a predetermined color in correspondence with defrosting conditions for frozen food and by providing an operating device comprising a setting panel colored in the same color with the corresponding trays and adapted to set the defrosting condition represented by said color, the operation of the defrosting apparatus becomes very easy and high operation efficiency can be obtained. Further, the provision of separately colored trays and the operating device can prevent production of bad defrosted food due to mis-operation in using the apparatus.

Figure 17:
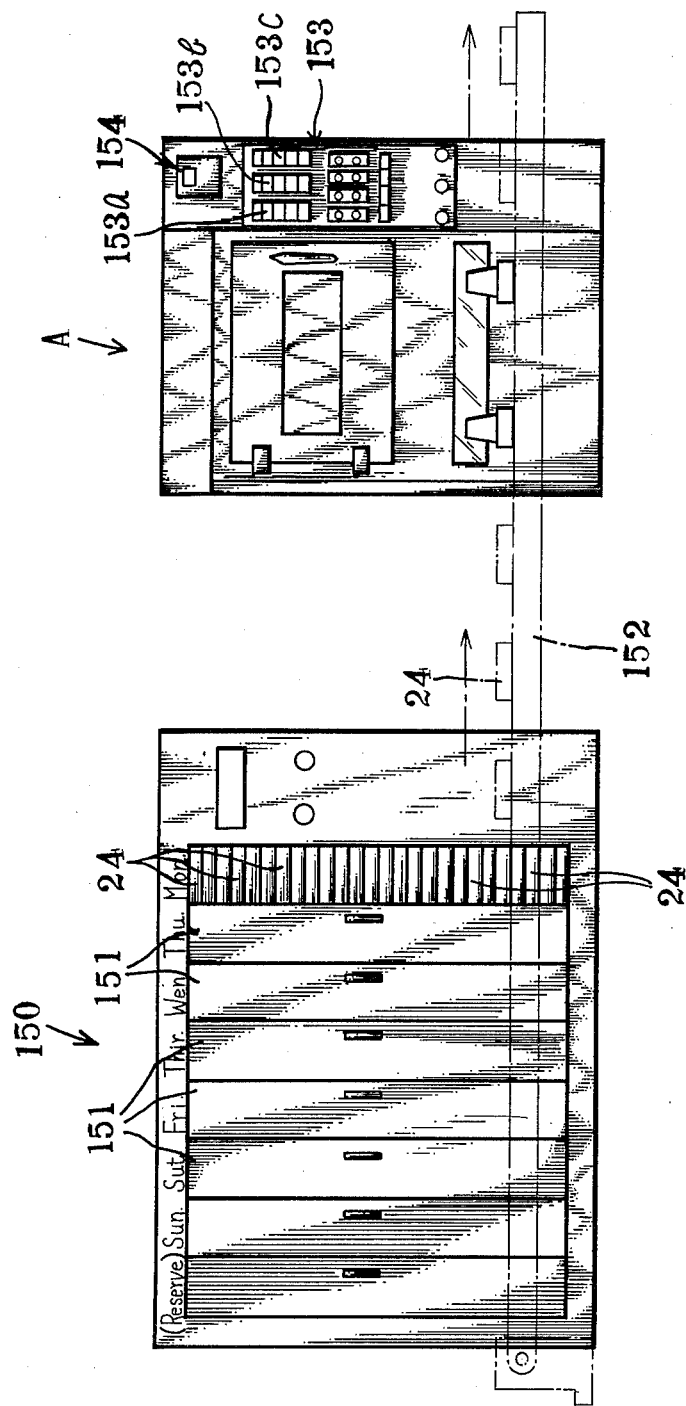
FIG. 17 is an explanatory view of another embodiment of the present invention.

In the embodiment as shown in FIG. 17, frozen food to be stored in the freezing chamber is precooked at a food center or the like, contained and arranged directly or through packaging in the trays predeterminedly colored on the basis of the kind of frozen food and then frozen. A number of trays containing such frozen food is put into groups, for example, according to the menu from Sunday to Saturday, transported to schools, hospitals, restaurants and the like and there systematically arranged in a freezing chamber previously installed. Thus, a defrosting apparatus according to the present invention is used as an automatic mass-feeding apparatus for systematically mass-producing and mass-feeding frozen food prepared by standardizing and freezing predetermined cool or hot food, and thus affording to run a self-service restaurants.

As abovementioned, by systematically combining a defrosting apparatus according to the present invention with cooking, food and freezing and storage stations, a new type of a convenient restaurant can apparently be established, whereby this apparatus can contribute much to automatization and reduction of labor in the restaurant and feeding trades.

What is claimed is:

1. A defrosting apparatus for frozen food comprising a casing defining a chamber, a plurality of trays for carrying various kinds of frozen food thereon, means for circulating said trays along a fixed path in said casing while each of said trays are always retained in a horizontal position, the trays being removably mounted on the circulating means, the casing being provided with an inlet opening for the trays and an outlet opening for the trays, the outlet opening being sized to be as small as possible but to permit one tray at a time to be removed therethrough, a cover consisting of a pair of half members movably mounted in the upper portion of said casing, means for closing said half members when actuated by the belowmentioned control means around one of said trays, means for irradiating micro-wave energy onto said one tray within said cover, means for selectively forming an atmosphere of heated dry air, heated humid air or steam within said casing, and a control means for successively actuating:
  a. said means for circulating trays to position one of said trays between said half members,
  b. said means for closing said half members to define said enclosed chamber for enclosing said one tray, and
  c. said irradiating means for a predetermined period of time.

2. The defrosting apparatus of claim 1 including means for spraying water onto said one tray in said cover.

3. The defrosting apparatus of claim 1 including means for irradiating infrared rays onto said one tray in said cover.

4. The defrosting apparatus of claim 1 including a control panel on the surface of said casing, the control panel having operating buttons for operating said control means and being colored in accordance with the defrosting conditions provided by the apparatus, each of said trays having a color selected from the colors of said buttons and in accordance with the defrosting condition to be applied to frozen food contained on the tray so that the selective operation for defrosting said frozen food is achieved by pushing the operating button having the same color as the tray.

5. The defrosting apparatus of claim 4 including means for spraying water onto said one tray in said cover.

6. The defrosting apparatus of claim 4 including means for irradiating infrared rays onto said one tray in said cover.

* * * * *